UNITED STATES PATENT OFFICE.

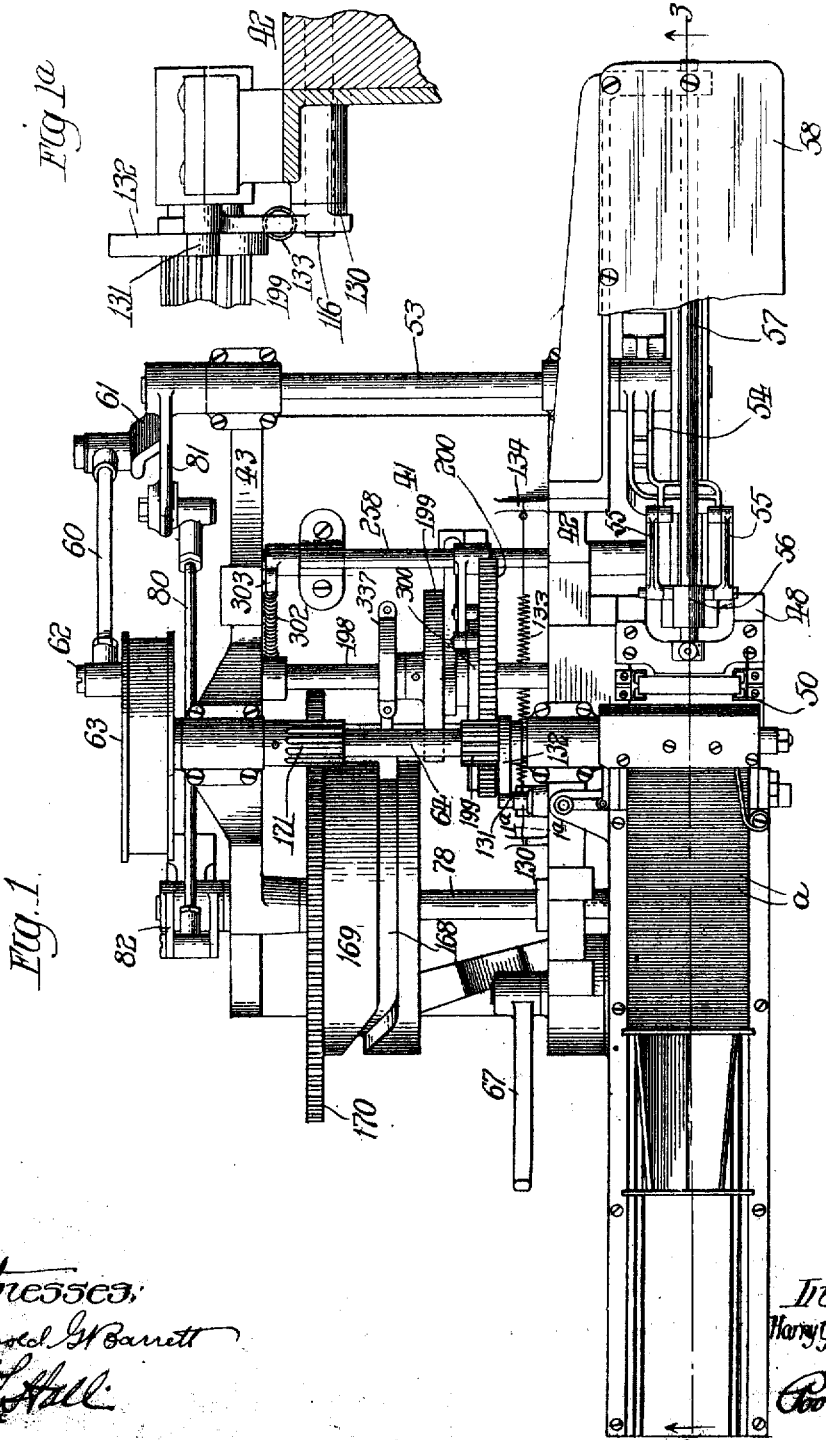

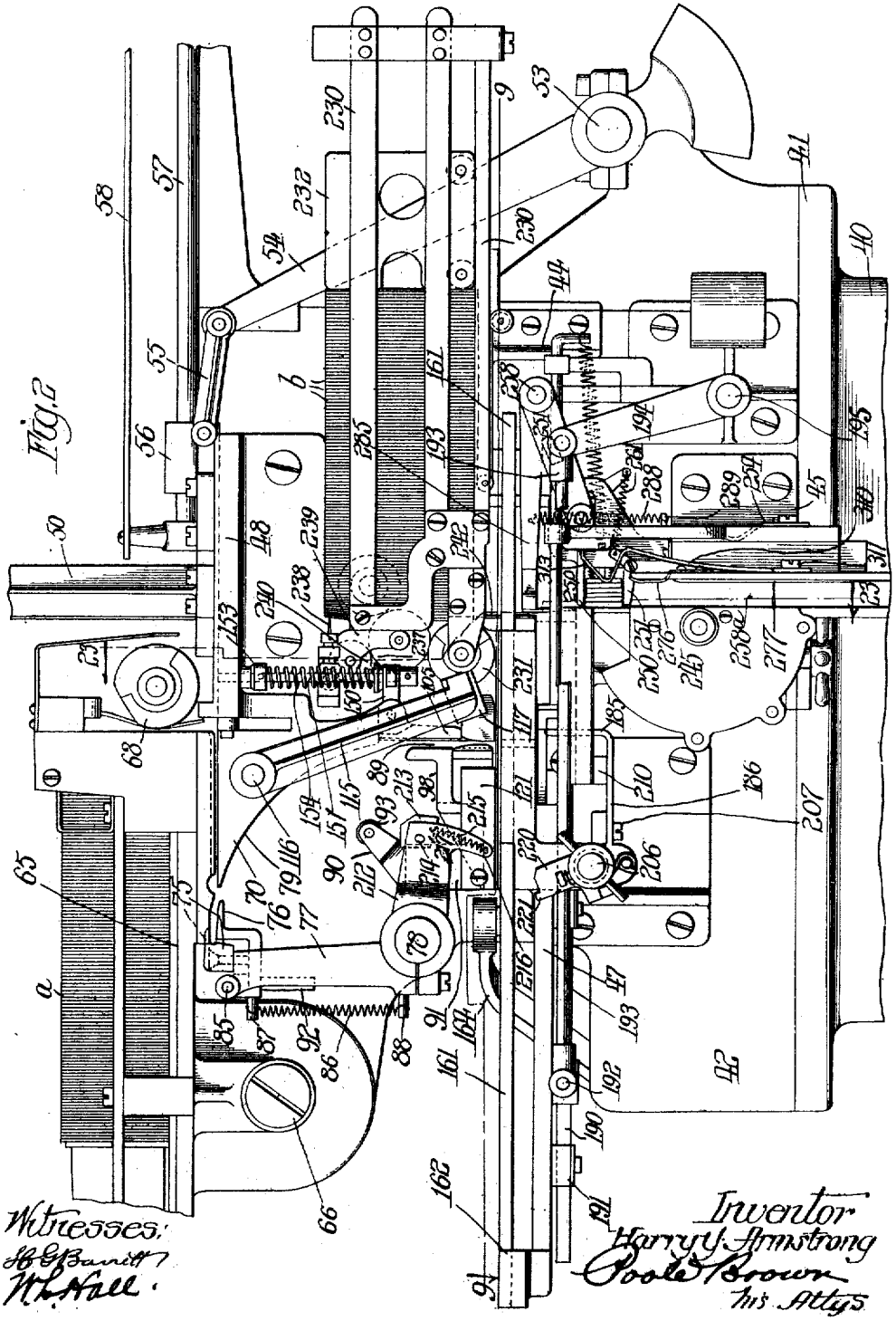

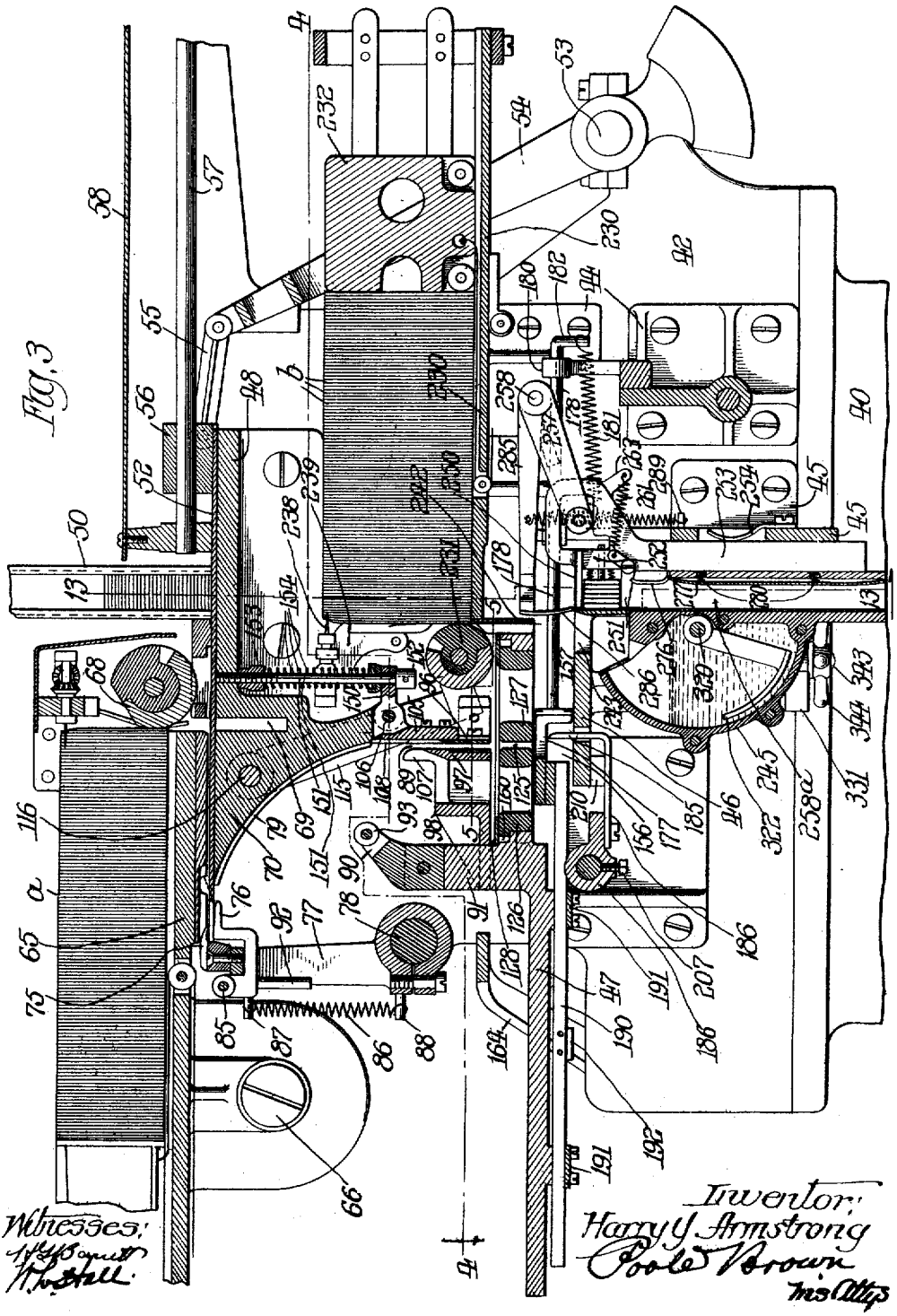

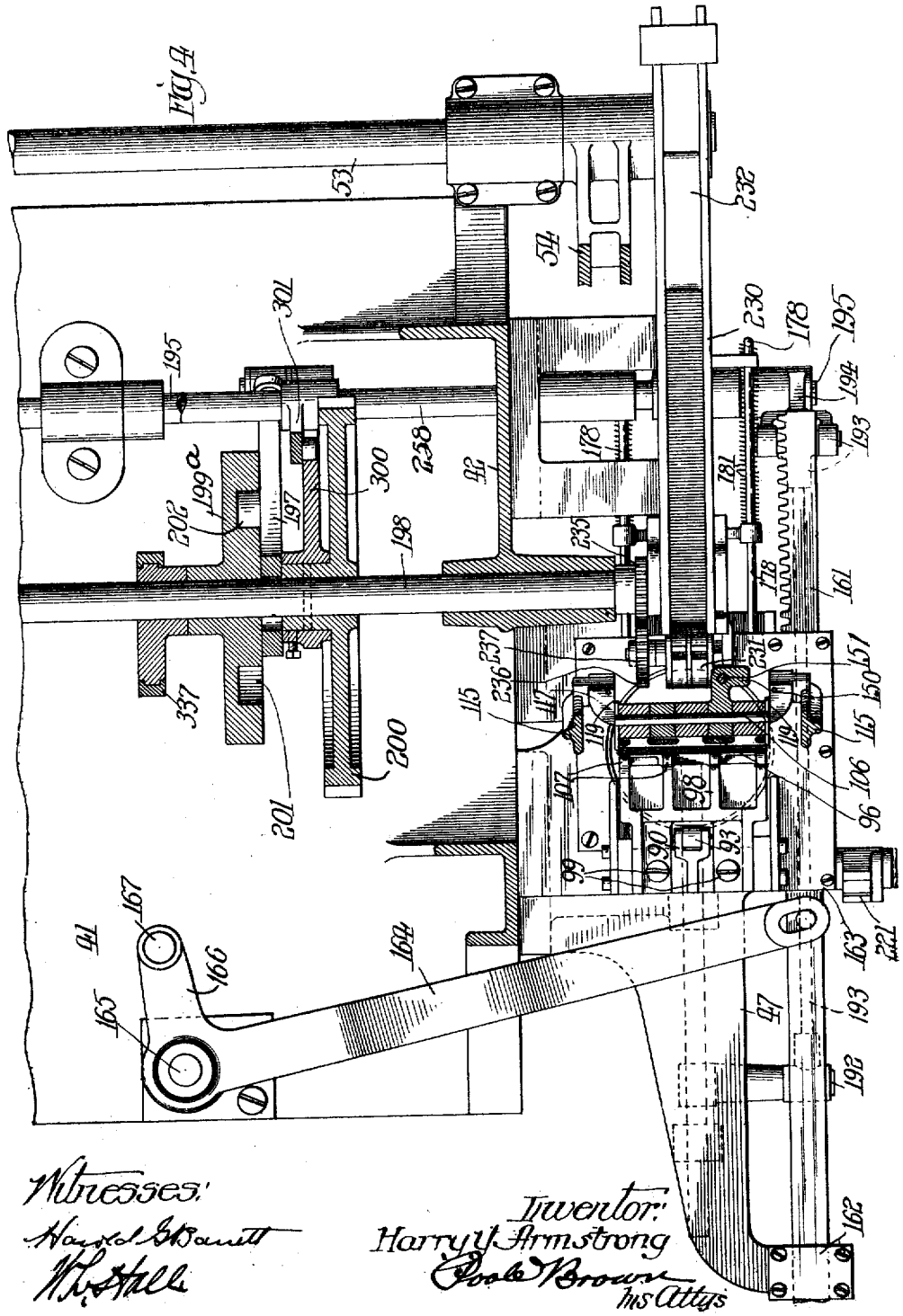

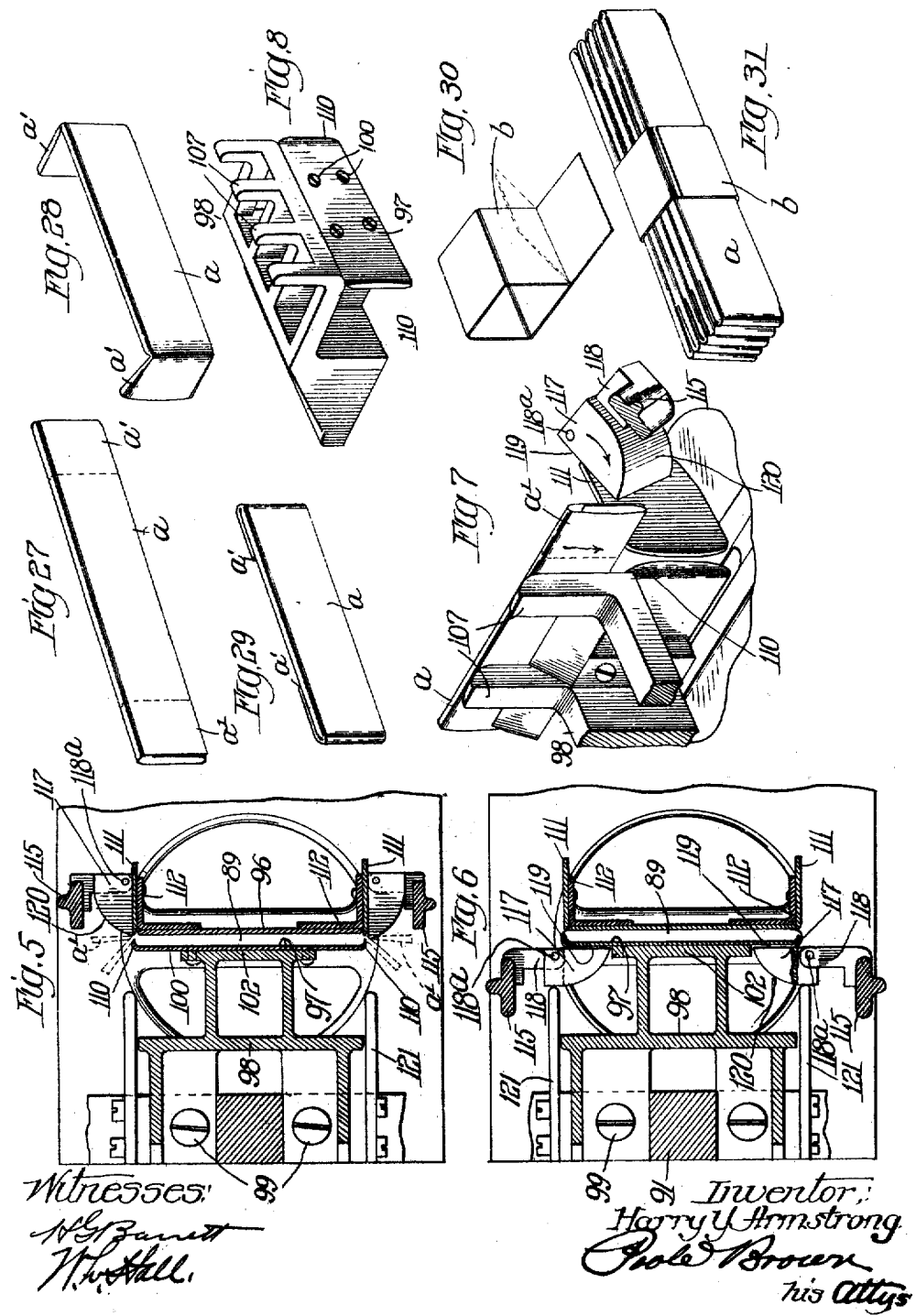

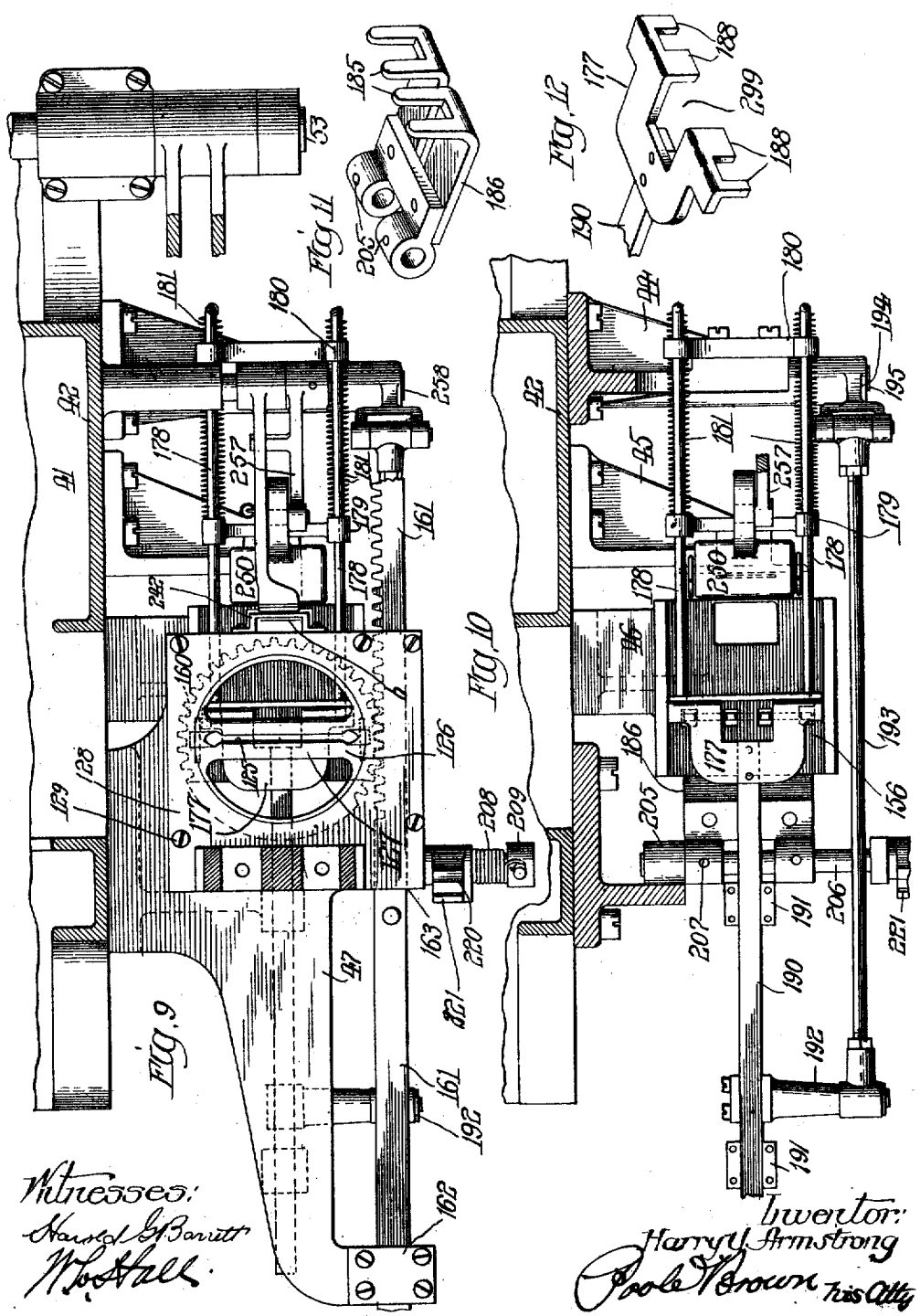

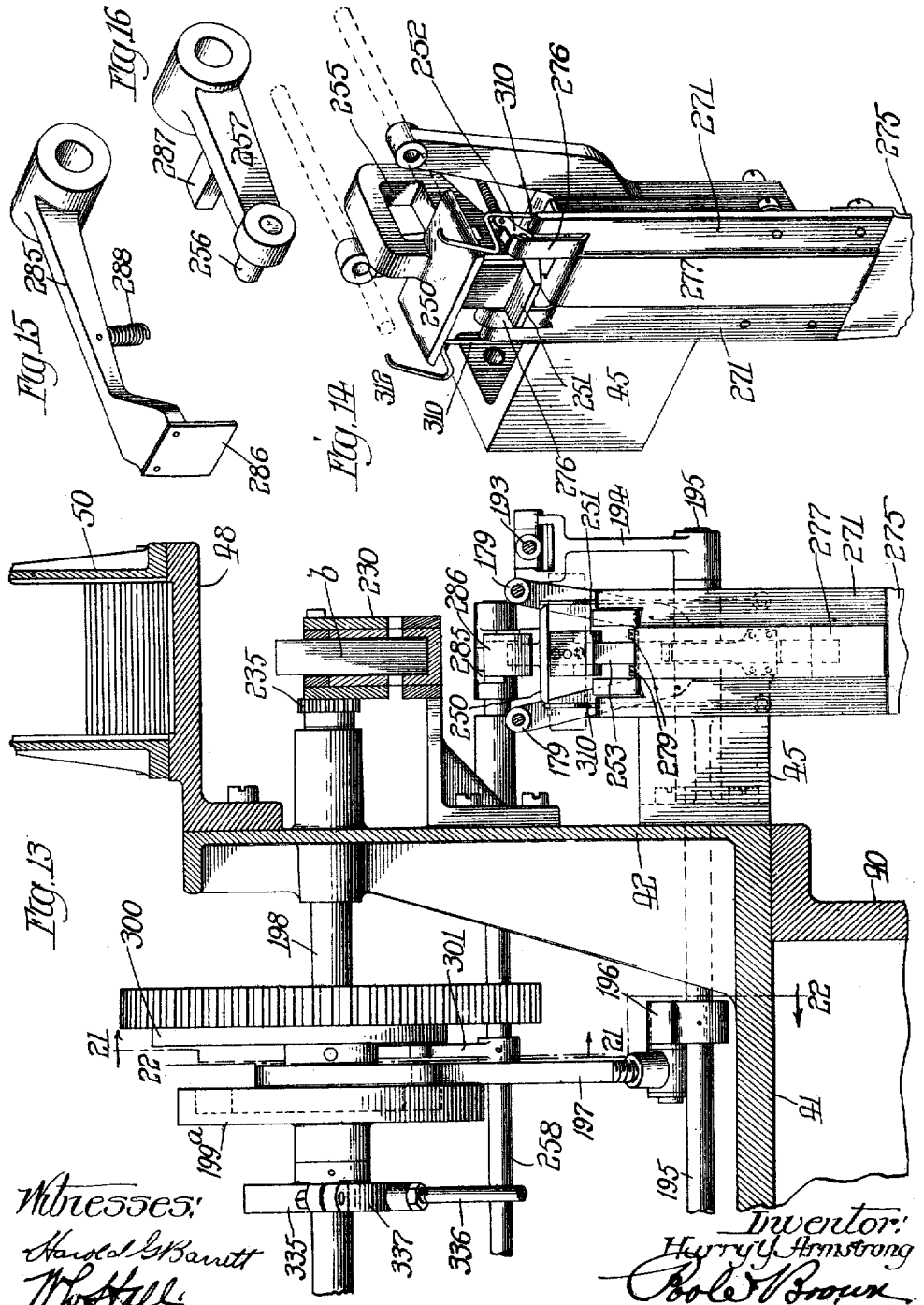

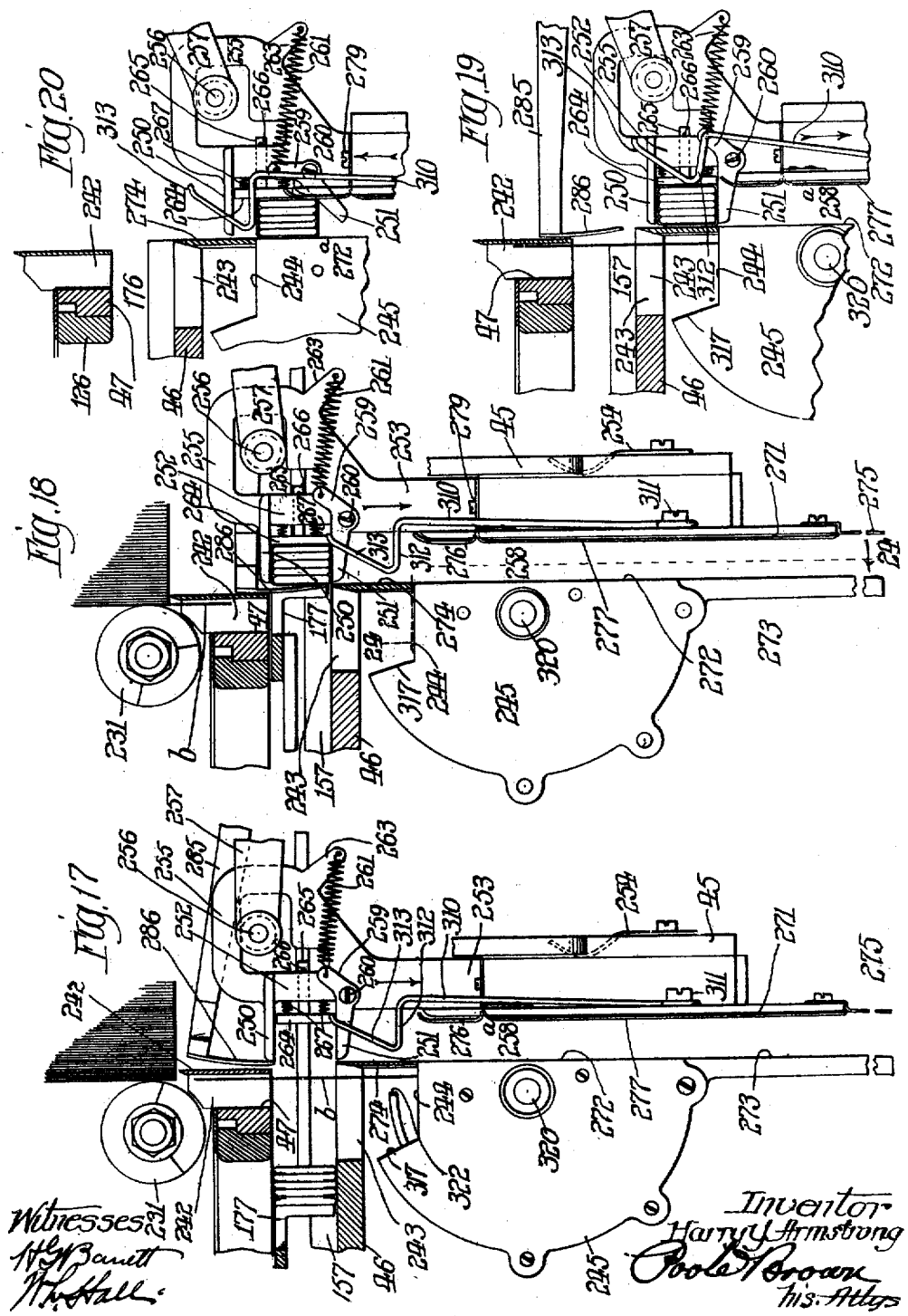

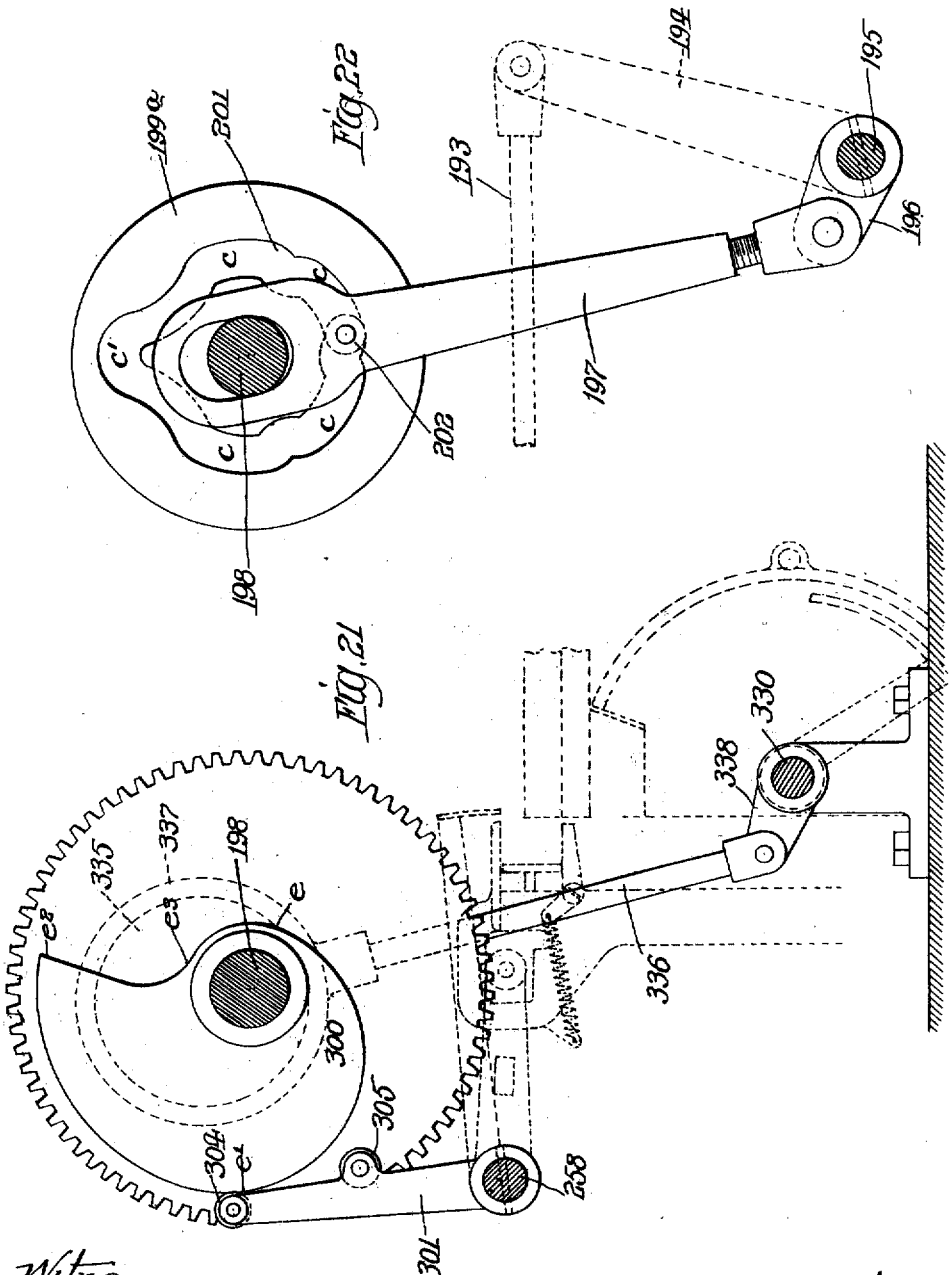

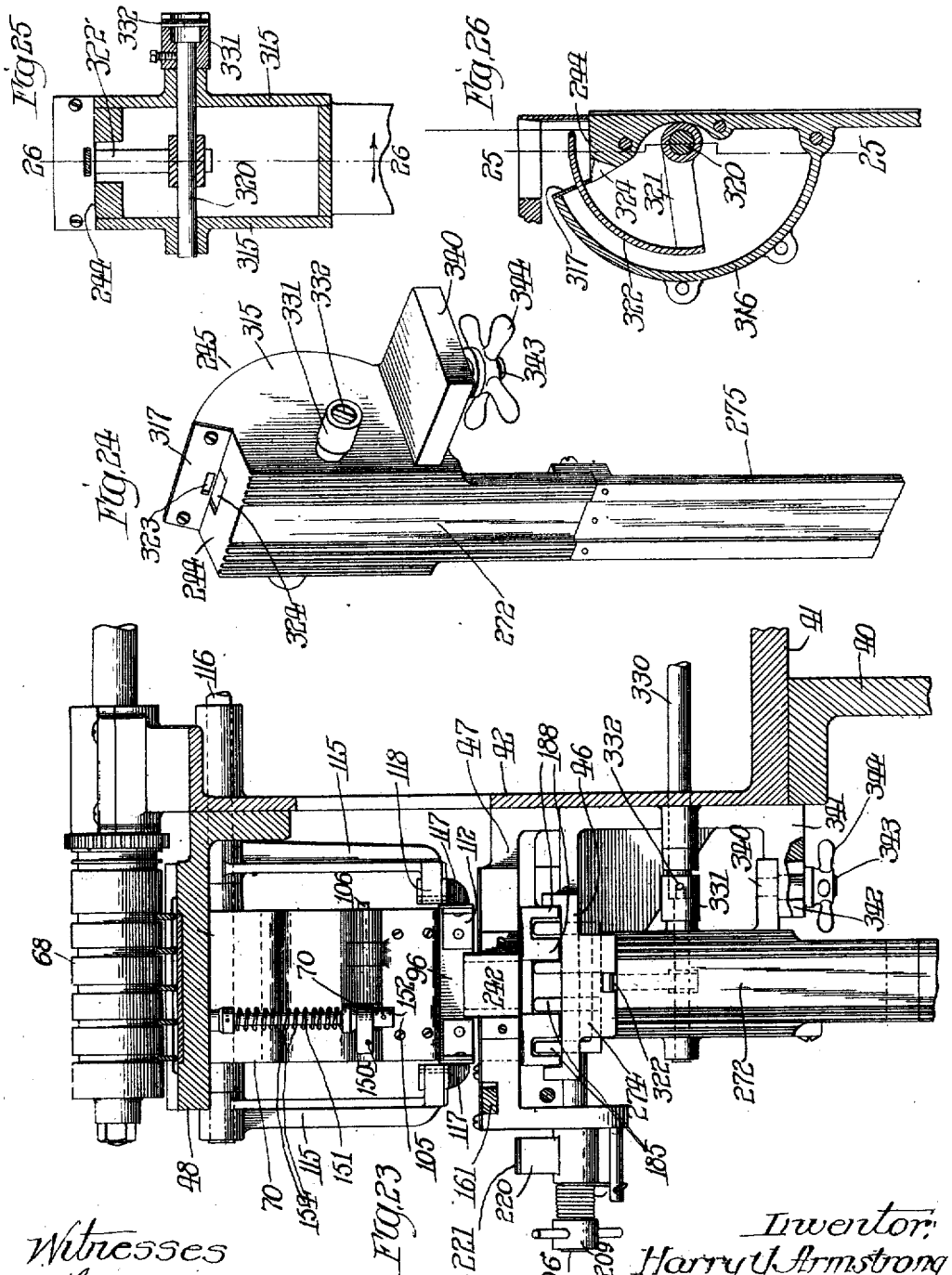

HARRY YARRINGTON ARMSTRONG, OF ELGIN, ILLINOIS.

WRAPPING-MACHINE.

No. 918,642.　　　Specification of Letters Patent.　　　Patented April 20, 1909.

Application filed May 3, 1907. Serial No. 371,622.

*To all whom it may concern:*

Be it known that I, HARRY Y. ARMSTRONG, a citizen of the United States, and a resident of Elgin, in the county of Kane and State of Illinois, have invented certain new and useful Improvements in Wrapping-Machines; and I do hereby declare that the following is a full, clear, and exact description thereof, reference being had to the accompanying drawings, and to the characters of reference marked thereon, which form a part of this specification.

This invention relates to improvements in wrapping machines of the general type shown in my two prior applications for United States Letters Patent, one filed March 21st, 1906, Serial No. 307,240, and the other filed December 6th, 1906, Serial No. 346,534.

The machine herein shown is designed and proportioned for wrapping elongated tablets or sticks of gum, confections or the like, but may of course be proportioned for wrapping square tablets for which the machines shown in the prior applications have been specially designed.

The objects of the invention are to improve and simplify wrapping machines of this general type, and a further object of the invention is to improve the mechanism for assembling the gums in groups of prescribed numbers and to thereafter apply a band about the group to properly confine the sticks or tablets constituting the group.

The invention consists in the matters hereinafter set forth and more particularly pointed out in the appended claims.

In the drawings:—Figure 1 is a plan view of a wrapping machine embodying my invention. Fig. 1ª is a detail as seen from the line 1ª—1ª on Fig. 1. Fig. 2 is a side view of the principal parts of the machine on an enlarged scale. Fig. 3 is a vertical section of the parts of the machine shown in Fig. 2. Fig. 4 is a horizontal section taken on line 4—4 of Fig. 3. Fig. 5 is a detail horizontal section, taken on line 5—5 of Fig. 3. Fig. 6 is a detail section of the same parts, showing them in changed positions. Fig. 7 is a fragmentary, enlarged detail showing the manner of bringing the gum into position for action by the folding devices. Fig. 8 illustrates a part constituting the rear wall of the slot in which the gums are contained while the end folds are being made. Fig. 9 is a horizontal section, taken on line 9—9 of Fig. 2. Fig. 10 is a horizontal section on a plane below that of the section shown in Fig. 9, illustrating the mechanism for assembling the gums into groups after they have been wrapped. Fig. 11 is a perspective view of a swinging device provided with fingers which constitute one side wall of the receiving chamber into which the gums are delivered after they have been completely wrapped, said device being arranged to swing downwardly to permit the gums to pass laterally out of the receiving chamber to the assembling chamber. Fig. 12 is a perspective view, detached, of a pusher for transferring the gums from the receiving to the assembling chamber to assemble the gums in groups, and operating thereafter to transfer the groups from the assembling chamber to the mechanism for applying the confining band about the groups. Fig. 13 is a fragmentary vertical section, taken on line 13—13 of Fig. 3. Fig. 14 is a perspective view of the mechanism for receiving and holding a group of gums while a confining band is being applied thereto. Fig. 15 is a perspective view of a folding device which aids to fold the confining band about the group of gums. Fig. 16 is a perspective view of a swinging arm for raising and lowering the pocket which receives and holds the groups of gums while the confining band is being applied thereto. Fig. 17 is a side view of the essential parts of the mechanism for receiving and holding a group of gums and the mechanism for applying the confining band thereto. Fig. 18 is a like view of said parts, showing a group of gums in the pocket in which they are held while the band is applied thereto. Figs. 19 and 20 illustrate said parts in two subsequent positions which they occupy during the operation of wrapping the band about the group of gums and disposing of the wrapped group. Fig. 21 is a view illustrating the cam mechanism for giving movement to the mechanism for applying the band to a group of gums and for actuating the band fastening mechanism. Fig. 22 is a view illustrating the cam mechanism for giving movement to the pusher which assembles the gums into groups and by which the groups are transferred to the band applying mechanism. Fig. 23 is a section taken on line 23—23 of Fig. 2. Fig. 24 is a perspective view of the paste-pot and one side of the discharge chute of the banding mechanism.

Fig. 25 is a section taken on line 25—25 of Fig. 26. Fig. 26 is a section taken on line 26—26 of Fig. 25. Figs. 27, 28 and 29 illustrate the manner of wrapping a stick of gum. Fig. 30 illustrates the manner in which the band is folded about a group of gums. Fig. 31 is a perspective view of a completed group of gums with the band thereon.

As shown in the drawings, 40 designates the upper end of the base or support of the machine and 41 designates a generally horizontal frame-plate which supports the parts of the machine above it. The said frame-plate is of such contour as to properly support and afford bearings for the operative parts of the machine. Among the more prominent configurations of the frame plate may be noted two vertical members 42, 43 rising therefrom, one at each side and supporting bearings for various horizontal shafts of the machine and the brackets 44, 45, 46, 47 and 48 extending laterally from the left-hand vertical frame plate 42 for supporting parts of the mechanism hereinafter to be described.

The mechanisms for feeding the gums to the wrapping mechanism, for delivering the wrappers into the path of the gums and for effecting the side folds of the gums and for the gums are generally similar to the construction shown in my aforesaid prior applications for United States Letters Patent filed on the 6th day of December, 1906, Serial No. 346,534, and only need to be generally referred to.

50 designates a vertical hopper which receives the gums and from the bottom of which they are fed to the wrapping mechanism. Said hopper is supported on the bracket 48 over a feed chute through which reciprocates a horizontal feed bar 52 that delivers the gums from the bottom of the stack in the hopper to the wrapping mechanism. Said feed bar is reciprocated through the agency of a horizontal rock-shaft 53, at the forward end of the machine, having bearings in the side frame plates 42, 43 and an arm 54 affixed to said rock-shaft and operatively connected at its upper end to said slide or bar (Figs. 1, 2 and 3). The operative connections in this instance comprises links 55, 55 hinged to the upper end of said arm and to laterally extending lugs of a sliding block 56 that is fixed to the rear end of said feed bar. Said block 56 is guided in its movement by means of a horizontal guide-bar 57 which extends through a guide opening in the block and is fastened to the machine in the manner shown in Figs. 1 and 2. A platform 58 is supported over said guide rod and block upon which the gums may be placed preparatory to placing them in the hopper 50. The rock-shaft 53 is rocked in its bearings through the medium of a pitman or link 60 (Fig. 1) connected at one end with an arm 61 rigid with the rock-shaft and at its other end with an eccentrically located pin 62 carried by a rotative wheel or disk 63 fixed on the end of a rotative shaft 64 extending transversely across the machine and mounted in the side plates 42, 43 of the frame plate. The said wheel 63 is fashioned to receive a driving belt through which driving power is communicated to the machine.

The machine shown is designed for wrapping a single wrapper about the gums. The wrappers are contained in a horizontal magazine 65 (Figs. 2 and 3) from the forward or inner end of which the wrappers are fed in the same general manner as in my two prior machines before referred to. Said magazine is pivotally mounted on a stud 66 fixed to the adjacent vertical plate 42 of the main frame, and is locked thereon by means of a handle 67. The wrappers are delivered one by one from the inner end of the group of wrappers in the magazine by means of a stripper roller 68 into a vertical wrapper receiving recess 69 located immediately below the inner end of said group of wrappers (Fig. 3). The said recess is formed in a thickened portion or head 70 at the rear end of the bracket 48. Said head 70 is located below and separated a distance from the rear end of the magazine by a horizontal space constituting a continuation of the feed slot through which the gums are delivered from the hopper 50 to the wrapping mechanism. The wrappers are fed into the wrapper recess 69 by the stripper roller and across the path of the advancing gums, and the first fold of each wrapper about the advance side of a gum takes place as the gum and wrapper are forced by the feed bar into the portion of the feed slot between the head 70 and the lower wall of the magazine. Each gum with one side fold of the wrapper thus effected about the advance side thereof is delivered between gripping jaws 75, 76 carried by the upper end of a vertically swinging folder arm 77. The said arm is affixed to a rock-shaft 78, (Figs. 1, 2 and 3) that extends transversely across the frame-plate of the machine and is rotatively mounted in the vertical frame members 42 and 43. Said shaft is rocked in its bearing to swing the upper end of the arm, carrying the jaws 75, 76, rearwardly toward a curved surface 79 of the head 70 and it is between said jaws and the upper part of said curved surface that the second side fold of the wrapper about the gum is effected in the same general manner as illustrated in my prior application, Serial No. 346,534 hereinbefore referred to. The rock-shaft 78 is actuated from the rock-shaft 53, before referred to, through the medium of a pitman or connecting rod 80 (Fig. 1) hinged at its rear end to an arm 81 rigid with said rock-shaft 53 and at its forward end to a two-part arm 82 fixed to the adjacent end of the rock-shaft 78. The gripping jaw 75 of the folder arm 77 is stationary while the gripping jaw 76 is hinged to move toward and away therefrom on a hinge pin 85 carried by the upper end of the arm. A spiral contractile spring 86 is attached at one end to a pin 87, fixed to the swinging jaw and at its other end to a pin 88 fixed to the lower end or hub of the folder arm, serves to hold the swinging jaw normally closed and to lightly grip a gum and wrapper between the upper and lower jaws as the folding arm is swung forwardly.

The swinging or folding jaw 77, in addition to folding the second side of the wrapper about the gum as it swings downwardly toward and past the curved folding surface 79, delivers the partially wrapped gum to a second folding slot 89 as in the construction of the machine shown in my aforesaid prior application No. 346,534. The swinging jaw 76 is designed to be opened to release the gum, at the time the folding arm is in position to deliver a gum to the second folding slot 89 referred to by means of a stationary cam 90 formed on the upper end of the standard 91 rising from the bracket 47 of the frame plate (Figs. 2 and 3), and is adapted to engage a pin 92 carried by said swinging jaw and depending therefrom. Said cam arm 90 is equipped with a roller 93 which engages said pin to minimize the friction between the parts. Said swinging folding arm is of two-part shank construction, as is indicated by a comparison of Figs. 2 and 3, and the tripping cam 90 is located in a plane between the two shanks of the arm so as to pass between said shank members when the arm is swung downwardly. The folder arm 77 delivers the gums at the lower limit of its swing into the second vertical slot 89, before referred to, in which the partially wrapped gum is held while the end folds of the wrapper are being made. The said slot is open at its top to receive the partially wrapped gums (Fig. 3) and is also open at its bottom to permit the wrapped gums to be discharged therefrom by pressure of the next following gums, as also shown in Fig. 3. The said slot is also open at its sides (Figs. 5 and 6) and the unfolded end flaps of the wrappers project therethrough, as shown in Fig. 5. The slot is formed between vertical front and rear walls 96, 97, respectively. The rear wall comprises a thin plate that is attached to the forward side of a member 98 (Figs. 2 to 6 and 8) mounted on an elevated part of the bracket 47 and secured thereto by means of screws 99. The rear wall plate 97 is attached by screws 100 to a forwardly extending vertical part 102 on said member 98. It will be observed that the said wall plate 97 extends at its ends beyond the vertical member 102 to which it is attached. The front wall 96 of the second folding slot 89 comprises a thin oblong, rectangular plate attached to the lower side of a swinging support 105 that is hinged to the lower end of the head 70 by means of a horizontal hinge pin 106 (Figs. 3, 4 and 23) that extends through overlapping lugs on said support and block. The front face of the swinging support constitutes, in effect, a continuation of the curved surface 79 of the head 70. The member 98 which carries the front wall of the slot 89 is formed at its rear end to provide upwardly extending fingers 107, shown best in Figs. 4, 7 and 8, the presence of which facilitates the entrance of a partially wrapped gum to the second folding slot 89.

Means are provided for preliminarily creasing the end folds of the wrappers at their bases as the partially wrapped gums are delivered to the second folding slot 95. This result is effected by the following construction: The rear wall plate 97 of said slot 89 is formed at its ends to constitute forwardly extending curved parts 110, shown best in Figs. 5, 6, 7 and 8. Located in front of said curved ends of the rear wall plate and disposed at right angles to said wall plate are two creasing blades 111, 111 which are attached to the front wall plate of the slot by angle pieces 112, 112. The rear vertical margins of said crimping plates are convexly curved, as shown in Fig. 7, and are located substantially in alinement with the rearwardly directed ends of the rear wall of the slot. The central part of said convex and curved ends of the crimping plates approach closely said forwardly curved parts of the rear wall plate of the slot. When the partially wrapped gums are forced into the slot, the end folds $a^1$ $a^1$ of the wrappers pass through the spaces between said crimping plates and the forwardly curved ends of the front wall plate of the slot, thereby subjecting the bases of the folds to the pressure that acts to crimp the same. By reason of the convex curvature of the margins of the crimping plates 111, the crimping will be more effective at the central parts of the bases of said end folds of the wrappers, a condition which facilitates the proper folding thereof.

Referring now to the mechanism for folding the end folds of the wrapper about the side faces thereof to complete the folding operation, said mechanism involves novel features of construction which are made as follows: 115, 115 designate two vertically swinging arms (Figs. 2, 3, 5, 6 and 23) which are fixed to and extend downwardly from a rock-shaft 116 that is mounted to rock in the head 70. The lower ends of said folding arm are located one at each end of the lower folding slot, as more clearly shown in Figs. 5 and 6, and said lower ends of the folding arms carry horizontally swinging folders 117, 117. The manner of connecting said folders to the folder arms comprise laterally extending lugs 118, 118 on the lower ends of the folding arms 117, 117 which enter suitably shaped sockets in the forward ends of said folders and are hinged thereto by hinge pins 118ª extending through the folders and lugs. The folders each comprises essentially a flat, vertical face 119 and an oppositely curved guide face 120. Said flat vertical face of each folder engages the lateral face of the adjacent crimper plate 111 and moves backwardly and forwardly over said lateral face of the crimper plate. The curved guide faces 120 of each folder is adapted to engage a suitably located stationary guide for properly guiding the folder in its movement. As herein shown, said folder assumes the form of solid metal or other suitable material block having the general contour of a triangle in cross-section, two sides of which constitute the lateral flat face 119 and curved guide face 120. The socket which receives the hinge lug 118 opens on the forward face of the block, as more clearly indicated in Fig. 6, so that the folder may swing from its normal position, wherein the flat side 119 thereof is at right angles to the hinge lug, as shown in Figs. 5 and 7, to a position wherein said flat side of the folder is parallel with said lug as shown in Fig. 6. Stationary guides are located in rear of the folders to engage said curved guide surfaces of the folders for the purpose of swinging them inwardly at the proper time into the positions which they are shown to occupy in Fig. 6, so as to fold the end flaps of the wrapper inwardly. Said guides are formed on the forward ends of vertical plates or bars 121, 121 (Figs. 2, 5 and 6) which are located just in rear of the crimping plates and in a vertical plane slightly outside the vertical planes of the side faces of the crimping plates. Thus when the folders are advanced from the position indicated in Fig. 5 toward said guide plates 121 to fold the end folds $a^1$ of the wrapper, said end folds are folded at right angles to the body of the wrapper by the straight movement of the folders as they are moved rearwardly. In the further movement of the folders, the advance ends of the curved surface 120 thereof strike the guide plates 121, thereby swinging said folders inwardly against the rear face of the rear wall of the folding slot, as indicated in Fig. 6. This movement of the folders carries the end folds $a^1$ of the wrapper against the rear face of said rear wall of the folding slot and completes the wrapping of the gum. The folders are thereafter retracted by a movement reverse of that just described. Before the retractive movement of the folders and while the end folds of the wrapper are still held against the rear face of the rear wall of the slot, the folded gum is discharged from the slot, through the medium of the pressure of the gums which follow, into a receiving chamber below, thereby preventing the end folds or flaps from springing outwardly when the folders are retracted. The said gums are discharged from the second folding slot into a vertically alined slot 125 of a turn-table, designated as a whole by 126, rotatively mounted beneath said second folding slot. Said turn-table comprises, as herein shown, a ring having an integral part or bar 127 extending diametrically thereacross, in which bar is formed the slot 125 through which the wrapped gums are discharged from the second folding slot to the receiving chamber referred to. The said turn-table is rotatively mounted in an elevated part of the bracket 47 and is held in place by means of a plate 128 attached by screws 129 to said bracket and having a central opening, as shown in Fig. 9. The purpose of said turn-table is to turn one of the gums of each group as said gum is passing therethrough in order that the first and last gums of each group shall face with their plain sides outwardly. The said folding arms 115 normally occupy the position shown in Figs. 2 and 3, with the folders disposed in the position indicated in Fig. 7, and the folding operation takes place during the rearward swing of the folding arms effected by mechanism now to be described, after which the folders return to their normal positions. The mechanism for rocking the folding arm shaft 116 for effecting these operations is shown more clearly in Figs. 1 and 1ª, and is made as follows: The inner end of said shaft 116 is provided with a rigid arm 130 that extends upwardly therefrom and carries at its upper end a laterally extending roller 131, designed for engagement by a cam 132 fixed to the shaft 64, before referred to. The shape of the cam is such that it positively holds the folder arms in their retracted positions during the proper period of rotation of the shaft 64, and the folding arms are advanced to carry the folders into their operative positions through the medium of a spring 133 attached at one end to the said crank arm 130 near the upper end thereof and extends forwardly and attached at its forward end to a stationary part of the machine frame, as shown at 134 in Fig. 1. It will thus be seen that the folders are advanced to their positions of operation by spring pressure of such strength as to perform the work designed, but upon occasion of clogging of the parts there will be no danger of the parts being broken.

The support 105 for the front wall of the second folding slot is yieldingly and swingingly mounted in order to permit said front wall and the parts carried thereby to be swung forwardly so as to admit of the slot being cleaned of any material that tends to clog the same. The means for thus mount-ing the support and the rear wall of the slot is made as follows: The said support is provided adjacent to its hinge with a forwardly extending arm 150 provided with a vertical aperture. 151 designates a rod that extends upwardly through the aperture of the arm and enters and has screw-threaded engagement at its upper end with an opening in the bracket 48 above the same. The said rod is provided at its lower end with a head 152 which engages the lower side of the apertured arm 150 to limit the rearward swing of the forward wall of the slot. Surrounding said rod and interposed between said arm 150 and a nut 153 having screw-threaded engagement with the upper end of the rod is a spiral, expansively acting spring 154 that bears against the arm to hold the same normally against the head 152 at the lower end of said rod. Said spring permits the rear wall of the folding slot to yield forwardly when required and to automatically return to normal position.

The machine thus far described, without the turn-table referred to, is complete and operative for wrapping the gums and discharging the same individually from the machine. The mechanism is so timed that when one gum is contained in the lower folding slot and the end flaps of the wrapper are being folded to their closed positions, another gum is contained in the upper or entering part of the slot between the arms 107 and the support 105. Immediately after the folders have done their work and before they are retracted, the folding arm 77 is swung downwardly to deliver another gum to the upper part of the slot. In so delivering another partially wrapped gum to the upper part of the slot, the entering partially wrapped gum forces the completely wrapped gum out of the slot by pressure applied through the intervening partially wrapped gum, or the end flaps of which are next to be folded.

In accordance with the operation of the present machine, which groups the gums and applies bands thereto, the gums are delivered separately and successively into a receiving chamber 156 below the turn-table and between the same and the upper face of the bracket 46, and thence are grouped in an assembling chamber 157 located laterally at one side of the receiving chamber. Thereafter the group of gums are transferred to mechanism for applying a confining band thereto.

Referring now to the mechanism for operating the turn-table to turn one gum of each group end to end, as stated, and for thereafter assembling the gums into groups, said mechanism is made as follows: The periphery of the turn-table is provided with a segmental series of teeth 160, shown more clearly in Fig. 9, designed to be engaged by the teeth of a horizontal, endwise reciprocating rack-bar 161. Said rack-bar is guided in suitable bearings 162, 163 formed on the lateral bracket 47 and is reciprocated through the medium of a horizontally swinging lever 164 (Fig. 4) that is hinged to a pin 165 rising from the horizontal frame plate 41 of the machine. Said lever is provided near its pivot with a short arm 166 that has a vertical pin 167 designed for engagement with a cam groove 168 (Fig. 1) of a wheel or disk 169 rotatively mounted on the rock-shaft 78 of the folder arm 77. The said cam-wheel or disk 169 is driven from the shaft 64 through the medium of an annular gear 170 on said disk or wheel meshing with a pinion 171 mounted on the shaft 64. The free end of said lever 164 is curved or raised upwardly from the frame plate of the machine and said free end of the lever has pin and slot connection with the rack-bar 161. The gear connections between the disk 169 and the shaft 64 are so timed that the rack-bar is reciprocated once during each period required to wrap a prescribed number of gums, five as herein shown, so that in every group of gums one of the outer gums thereof is reversed. The wrapped gums are transferred from the receiving chamber 156 to the assembling space 157 through the medium of a reciprocating plunger 177 which reciprocates through the receiving chamber just after each wrapped gum is delivered thereto. At the time the wrapped gums are delivered to said receiving chamber the plunger occupies a position in rear of the plane of the slot of said turn-table. Thereafter the plunger is forced forwardly to transfer the wrapped gums, while remaining edgewise, to the assembling space. In order to maintain the gums in an upright position on their edges during the assembling of a group of gums in the assembling space 157, the gums are pressed against yielding abutments on the side of the assembling space remote from the receiving chamber consisting, in this instance, of two horizontally movable, laterally separated, spring pressed rods 178, 178 (Figs. 3, 9 and 10). Said rods are mounted for endwise movement in suitable guides 179, 180, stationary with the machine frame. Said yielding rods engage at their rear ends the forwardmost gum of each group as it is being formed. The rods are pressed rearwardly by means of spiral contractile springs 181, 181 attached at their forward ends to the downturned end portions 182 of said rods and at their rear ends to stationary parts of the machine.

In order to maintain a forming group of gums in the assembling space separate from the gums that are dropped one by one into the receiving chamber, and also to maintain the separate gums in the receiving chamber on edge, a partition is provided between said receiving chamber and assembling space which is constructed to be lowered each time a wrapped gum is transferred from said receiving chamber to the assembling space. Said partition comprises, in the present instance, vertical fingers 185, 185 formed on the forward end of a horizontal, vertically swinging arm 186 (Figs. 2, 3 and 11) that is located below the bracket 46 with its fingers extending upwardly through openings in said bracket which constitutes the lower wall of the receiving chamber and assembling space, as stated. Said arm is operatively connected with mechanism for depressing or swinging the same downwardly to move the fingers out of the path of the plunger 177 at the time the gum is to be shifted from the receiving chamber to the assembling space, as will hereinafter be described. The said plunger 177, which is shown separated from the associated parts in Fig. 12, is provided with downwardly extending fingers or projections 188, 188 which ride upon the face of the bottom of said receiving chamber and assembling space. Said fingers are so disposed that in the retractive movement of the plunger, or at the time said plunger is moved rearwardly past the vertical plane of the slot of the turn-table, the spaces between the fingers of said plunger pass over the upwardly directed partitions forming fingers 185, so that said plunger may be retracted without the necessity of depressing said partition fingers. Each time the said transfer plunger 177 retires or is retracted to its rearmost position, the gum or gums between the same and the yielding rods 178 are pressed rearwardly by said rods until they strike the partition fingers 185, and said gum or gums are held in their upright position between said spring-pressed rods and the partition fingers until another gum is delivered to the receiving space, at which latter time the partition fingers are depressed to permit the gum to pass from the receiving chamber to the assembling space. Thus it will be seen that at all times the gums in the receiving space are maintained in an upright position under the influence of the spring-pressed rods 178. In the event that the prescribed number constituting the group of gums is five, the plunger is operatively connected with mechanism which reciprocates the same in such manner as to impart to said plunger four uniform strokes to deliver four wrapped gums from the receiving chamber to the assembling space and the fifth stroke is of sufficient length to deliver the entire group of gums from the assembling space to the mechanism which applies the band about the same, as will now be described. The said transfer plunger 177 is provided with a shank 190 that engages suitable guides 191, 191 underneath the bracket 47 (Figs. 2, 3 and 10). Extending laterally from the outer end of said plunger shank is a rigid arm or stud 192. 193 designates a link or connecting rod that is hinged at its rear end to said stud 192 and at its forward end is hinged to the upper end of a vertically swinging arm 194, which latter is fixed at its lower end to a rock-shaft 195 disposed transversely of the machine frame and having suitable bearing therein. Affixed to the inner end of said shaft is a short crank-arm 196 (Figs. 13 and 22). Hinged to the end of said short crank-arm is a reciprocating cam actuated link 197 that is provided at its upper end with an elongated slot through which extends a rotative shaft 198 that extends across the machine frame and is mounted in the side plates 42 and 43 (Fig. 1). The said shaft 198 is rotated from the shaft 64 through the medium of a gear pinion 199 on the latter shaft and an intermeshing gear wheel 200 on the shaft 198. Fixed to the said shaft at the side of the lever is an actuating cam 199$^a$ that is provided with a closed cam groove 201 which is engaged by a roller bearing stud 202 carried by said operating bar or rod 197. It will be observed from an inspection of Fig. 22 that the cam groove 201 is divided into five parts $c$ $c$ $c$ $c$ and $c^1$. The movement imparted to the plunger as the roller stud 202 passes through the parts $c$ of the cam groove is only sufficient to move the transfer plunger from the receiving chamber to the assembling space to assemble the gums into groups. While the said roller stud, however, passes through the deeper portion $c^1$ of said cam the plunger not only transfers the last gum of the group to the assembling chamber, but transfers the entire group to the mechanism for applying the band to the group of gums.

Referring now to the manner of swinging said arm 186 on its pivot for withdrawing the partition fingers 185 below the level of the floors of the receiving chamber and assembling space for the purpose stated, said parts are more clearly shown in Figs. 2, 3, 4, 10 and 23 and are made as follows: The said swinging frame 186 is provided at its rear end with sleeves 205 (Fig. 11) through which extends a rock-shaft 206 and upon which rock-shaft said arm is affixed by screws 207 (Figs. 3 and 10). Said frame is normally held in its uppermost position with the partition fingers 185 extending in the path of the transfer of the gums from the receiving chamber to the assembling space by means of a volute spring 208 encircling said rock-shaft 206 and fastened at one end to a nut 209 fixed at one end to the outer end of said shaft and at its other end to a stationary part of the machine. A stop-block 210 (Figs. 2 and 3) carried by said arm limits the upward movement thereof. The arm is swung downwardly about said rock-shaft as a pivot by means of an arm 212 fixed to the rock-shaft 78 which carries and actuates the folder arm 77. The said arm 212 extends forwardly and downwardly from said rock-shaft and carries at its forward end a spring-restrained pawl 213 which extends forwardly beyond said arm (Fig. 2), and is hinged to the forward end of the arm by a pin 214. A spiral contractile spring 215, attached at one end to a downwardly directed tail-piece 216 of said arm and at its other end to said pawl 213, serves to hold said pawl downwardly against a shoulder 217 formed on the inner side of said arm. Attached to the rock-shaft 206 carrying said partition finger arm is a radial arm 220 provided with a projection 221 that is adapted to be engaged by said pawl 213 during the time the folding arm 77 is swung downwardly and during which time, therefore, the tripping arm 212 is swung downwardly. The spring 215 permits said pawl to yield backwardly when it strikes the projection 221 of said rock-shaft arm 220 so that said pawl at this time passes behind or in rear of said arm 220 without actuating the same. Upon the return movement of the folder arm and the arm 212 movable therewith, the pawl strikes the rear face of the projection 221 and, inasmuch as said pawl cannot yield in this direction, by reason of its abutment against the shoulder 217, the said arm 220 is thus swung forwardly, with the result of swinging the partition fingers downwardly for the purpose set forth. After the arm 220 has been swung forwardly a distance to bring the partition fingers below the level of the receiving chamber, it has swung a sufficient distance to permit the pawl to pass the same, whereby the spring 208 returns the parts actuated thereby.

Referring now to the mechanism for applying the band $b$ to the groups of gums and for pasting the said band about the gums, said parts are shown more clearly in Figs. 2, 3, 14 and 21, both inclusive, and 23 to 26, both inclusive, and is made as follows: The mechanism herein shown for applying the confining band to the group of gums thus arranged and delivered to the band applying mechanism, embraces in general terms means for feeding the band across the path of group of gums, a pocket adapted to receive the group and into which the group and the middle part of the band is forced by the plunger 177 in a manner to wrap the band about the front and top and bottom sides of the group, and means for thereafter folding the ends of the band in overlapping relation upon the rear side of the group and applying paste to one end of the band to hold the band in place. I have herein shown a convenient mechanism for effecting the foregoing operation, although it will be understood that the essential feature of the operation may be effected by other mechanism than that herein shown. As a further special improvement in this feature of the mechanism, an elongated chute is provided through which the groups of gums are discharged after the band has been applied thereto, arranged to hold the groups under pressure for a time until the paste sets or partially dries.

Referring now in detail to the band applying mechanism, 230 designates, as a whole, a horizontal magazine which contains in flat form the blanks constituting the wrappers, said wrappers being arranged on end and pressed flat together. The magazine is open at its rear end and the wrappers are stripped one by one from the rear end of the series of wrappers by means of a stripping roller 231 of any convenient or suitable form. They are held confined between said roller and a follower 232 at the forward end of the magazine which may be spring or weight-pressed against the bands as desired. The said stripper roller 231 is operated from the shaft 198 (Figs. 2 and 4) through the medium of a gear 235 on the shaft 198, a gear wheel 236 on the shaft of the stripper roller and an intermediate gear wheel 237 meshing with said gear wheel. A rotating needle 238 is applied to the forwardmost bands of the groups at the upper sides thereof, as shown in Figs 2 and 3, which penetrate the first few bands in order to prevent more than one band being stripped from the bundle or group at a time, in the same general manner as illustrated in my aforesaid prior application, Serial No. 346,534. Said rotative needle is supported in a suitable bearing 239 mounted on the rear end of the wrapper magazine and is operated from the gear wheel 237 through the medium of a gear wheel 240 in the same general manner as in the construction shown in my aforesaid prior application, Serial No. 346,534. The bands are directed by the stripper roller 231 from the magazine through a suitable guide 242 that is attached to the forward end of the elevated part of the bracket 47 which serves as a bearing for the turn-table (Figs. 9, 17, 18, 19 and 20). The bracket 46 which constitutes the floor of the receiving chamber and assembling space is provided in line with the rear end of the band magazine with an opening 243 through which the bands stripped from the group in the magazine fall until arrested by a suitable support beneath said ledge or bracket. As herein shown, the said support which arrests the bands consists of an upwardly facing part 244 of the casing of a glue-pot 245, the construction and use of which will be hereinafter explained. The assembling space, formed between the turn-table and its bearing bracket 47 and the lower bracket 46, terminates just beneath the rear end of the band magazine. Just in front of the forward end of said assembling space is located, what I have denominated, a pocket made of a suitable shape to receive and hold the groups of gums delivered thereto by the plunger 177 while the bands are applied to said groups. The said pocket comprises, in general terms, a top member 250 (Figs. 17 to 20), a bottom member 251, and a front member 252. The said pocket is opened at its rear end in line with said assembling space when occupying its upper or receiving position. The pocket thus formed is carried by the upper end of a vertically movable frame or standard 253 that has guiding engagement with a vertical guide-way in the bracket 45 and is free to rise and fall therein. Said pocket standard or frame is held frictionally in different vertical positions in said guide opening by means of a spring 254, (Figs. 17 and 18) that is fixed to the bracket 45 and is curved rearwardly for engagement with the rear face of said shank. The pocket is made of less lateral width than the length of the gums and is open at its lateral sides to permit the group of gums to extend laterally beyond the same, as will be clear from an inspection of Fig. 14.

The upper end of the pocket frame or standard is formed to provide a yoke 255 having a horizontal slot that is adapted for engagement by a laterally projecting stud 256 of a vertically swinging arm 257 that is fixed to and extends rearwardly from a horizontal rock-shaft 258 that has bearing in the frame of the machine vertically above the rock-shaft 195 (Figs. 2 and 17 to 19, both inclusive). The swinging of said lever vertically operates to raise and lower the pocket frame and the pocket carried thereby. The lower wall 251 of said pocket is constructed and arranged to swing downwardly at its rear end, as shown in Fig. 20, to permit the pocket to rise from a lower position to its upper position while leaving the group of gums carried downwardly thereby in a prior descent in the discharge chute 258ª, located immediately below said pocket. For this purpose, said lower wall comprises a plate having lateral lugs 259 forwardly past the sides of the pocket frame standard 253 and pivoted thereto through the medium of a pivot pin 260. The said swinging lower wall is held normally in its uppermost or horizontal position by means of a spiral contractile spring 261 attached at its rear end to one of said lugs 259 of said lower wall and at its forward end to an arm or projection 263 extending forwardly and downwardly from the yoke. The forward wall 252 of the pocket is provided with a yielding backing plate 264 with which the group of gums have direct contact when forced into the pocket, thereby avoiding breakage of said gums due to the pressure of the transfer plunger 177. Said plate 264 is mounted on the rear end of the short stem 265 that extends forwardly through a suitable guide opening in the pocket frame or standard, and said stem is provided in front of said standard with a cross-pin 266 which constitutes a stop to limit the rearward movement of the plate. Spiral expansively acting springs 267 interposed between the plate and the standard of the pocket holds said plate yieldingly in its forwardmost position. The said plate 264 constitutes also a resilient means against which the middle portions of the bands are compressed when forced into the pocket or recess by the gums, thereby holding the bands fixed relatively to the gums during the folding of the bands about the gums of the groups, and while the ends of the bands are being folded one on the other to paste them together by the means provided therefor. The said chute 258 is made of such length as to hold the groups of gums and the encircling bands compressed for a sufficient time, while the said groups are progressing therethrough, to permit the paste on the bands to set, as before stated. Said chute is formed between a plain vertically, elongated surface 271 of the bracket 45 of the frame and a parallel vertical surface 272 formed on the forward wall of the glue-pot 245 and a downward extension or tail-piece 273 of the glue-pot. Between the upper end of the vertical surface 272 of the glue-pot and the bracket 46 of the frame is located a vertical plate 274 that constitutes the upper part of the rear wall of the said discharge chute. If desired, in order to elongate said chute for the purpose set forth, an extension plate 275 may be attached to the lower end of the front wall 271 of said chute, and the rear wall, constituted by the extension 273, correspondingly elongated. Flat springs 276, 277 are applied to the front wall of the chute (Figs. 13, 14, 17 and 18), two springs 276 being located at the upper end of the chute, one at each side of the lower swinging wall of the pocket and a single, centrally located, longer spring 277 extending downwardly. The lower ends of said upper, laterally separated springs are turned inwardly, as shown in Fig. 14, and fastened by screws 278 to the top of the bracket 45. The lower elongated spring plate 277 is likewise turned inwardly at its top and fastened to the said upper end part of the bracket 45 by means of screws 279. The said inturned upper end of the central spring-plate 277 is notched to provide arms that extend one at each side of the standard of the pocket. The said central spring-plate 277 is shown in Fig. 3 as backed by spiral contractile springs 280 located in the rear face of the front wall of the discharge chute. The purpose of said spring is to impart a yielding pressure on the gums as they are discharged through the chute, thus holding the pasted parts tightly together to facilitate the setting of the paste on the bands, yet without retarding the progress of the gums.

It will be noted by an inspection of Figs. 17 and 18 that when a group of gums is forced into the pocket it carries with it a band and folds the latter on three sides of the group. Thereafter the upper free end of the band is folded downwardly across the rear face of the group and finally the lower end of the band is folded upwardly in overlapping relation to said other end as the group of gums descend into the upper end of the chute, carried by said pocket.

Next referring to the devices for folding the free ends of the bands across the rear sides of the groups, they are made as follows: 285 designates a vertically swinging folding lever (Figs. 2, 3, 17 and 18) that is hinged at its forward end to the rock-shaft 258 to which is fixed the pocket operating arm 257. The said swinging folding lever is provided at its forward end with a flat folding finger 286 which is located just above the discharge chute 258 substantially in the plane of the rear wall of said chute, as clearly shown in Figs. 17 and 18. The said folding lever is normally held in its uppermost position, above the level of the assembling space, as shown in Fig. 17, by means of a lug 287 on the pocket actuating arm 257 which is designed to engage the lower margin of said folding lever. The said parts are so arranged that when the pocket actuating arm is in its uppermost position the folding lever and finger are also in their uppermost positions. A spring 288 is applied to the folding lever to draw the same downwardly when the arm 257 is depressed, said spring being shown as a spiral spring attached at one end to said folding lever and at its other end to a pin 289 of the bracket 45 (Figs. 2 and 3).

The general operation of the band applying mechanism thus described may be stated as follows: The group of gums of the prescribed number, five as herein shown, are forced into the pocket by the plunger 177 when the pocket is in the position indicated in Figs. 17 and 18. The plunger remains in the position indicated in Fig. 18 until the pocket carrying frame is depressed to carry the group of gums into the upper part of the discharge chute 258ᵃ; the cam track 201 of the cam 199 being shaped to produce a proper dwell of the transfer plunger at this time. At the time the group of gums is moved inwardly in the pocket, the band b extends across the path of the gums, as stated, and is carried by the gums into the pocket, being thus folded upon the forward and the top and bottom sides of said group. Thereafter the arm 257 is depressed to force the pocket downwardly to carry the group of gums contained therein into the upper end of the discharge chute. The first part of the downward swing of the arm 257 has no effect to lower the pocket and its standard because of the fact that the slot of the yoke 255 is vertically wider than the diameter of the pin or lug 256 of said arm. The first effect of swinging said arm 257 downwardly, therefore, is to release the folding lever by depressing the lug 287 of said arm 257 away from the folding lever and allowing the same to be swung downwardly through the action of its spring 288. The downward swing of said folding lever serves to force the folding finger 286 in rear of the group of gums, which is still being held in the pocket at the level of the assembling space, in a manner to fold the upper free end of the band downwardly against the rear face of the group of gums, as shown in Fig. 18. The pusher or plunger head 177 is centrally cut away to form a notch 299, as shown in Fig. 12, to receive the folding finger 286 at this time while the plunger is in its rearmost position, as indicated in Fig. 18. After said pin or lug 256 of the arm 257 strikes the bottom of the slot of said yoke it serves to depress the pocket and the group of gums carried thereby to the position shown in Fig. 19. The folding lever 285 is, however, arrested by engagement of the end of the folding finger with the upper end of the rear wall of the discharge chute, as shown in said Fig. 18. As the said group of gums with the band partially wrapped therearound is moved from the position shown in Fig. 18 to that shown in Fig. 19, the upper end of the rear wall of the discharge chute serves to fold the lower free end band upwardly against the rear face of the package in overlapping relation to the previously folded end. While the band is in the position shown in Fig. 17, paste is applied to the rear face of the lower end thereof in a manner hereinafter to be described, so that as said last folded end of the band is folded upwardly in overlapping relation to the first folded end thereof, the paste bearing face of the band engages the outer face of the first folded end, whereby said ends of the band are pasted together.

The means for releasing the groups of gums from the pocket after they reached the position indicated in Fig. 19 is embraced in the construction wherein the lower wall 251 of said pocket is a swinging wall combined with means for holding the groups of gums down while the pocket raises. Such latter means comprises two spring actuated stop rods 310, 310 located in front of said discharge chute and attached to the bracket 45 by means of screws 311. The rods are formed at their upper ends to provide horizontal rearwardly extending parts 312 constituting downwardly facing stop shoulders and upwardly and forwardly inclined parts 313. The said inclined upper ends of said holding rods are so arranged as to permit the gums to pass downwardly into the discharge chute, the rods springing backwardly at this time, as indicated in Fig. 19. After the group of gums has passed below the level of the horizontal or shouldered parts of the rods, said rod springs inwardly to the position indicated in Fig. 20, so as to hold the gums from rising when the pocket and its frame are again raised to the level of the assembling space 157. As the pocket is raised, the lower wall thereof swings downwardly to clear the group of gums, as indicated in Fig. 20, thereby permitting the pocket and its frame to move upwardly to the level of the assembling space. After the lower wall has passed the level of the group of gums just deposited in the discharge chute the springs 261 serve to swing said lower wall of the pocket into its uppermost position, in which position it is arrested by contact with the lower margin of the backing plate 264 of the pocket. The pocket is now in the position shown in Fig. 17, and is ready to receive another group of gums. The forcing of successive groups of gums into the upper end of the discharge chute serves to gradually advance the said groups through the discharge chute, the groups or packages being thus intermittently moved through the discharge chute.

The mechanism for actuating the rock-shaft 258 to effect the swinging of the pocket operating arm is shown more clearly in Figs. 1, 13 and 21, and is made as follows: 300 designates a cam which is fixed to the shaft 198 at one side of the plunger operating cam 199$^a$. 301 designates a swinging cam arm that is fixed to the inner end of the rock-shaft 258. The cam operates to swing said arm 301 rearwardly and the pocket frame upwardly, and the pocket is depressed through the medium of a spring 302 applied to the rock-shaft 258, as shown more clearly in Fig. 1, said spring 302 comprising a spiral contractile spring that is attached at one end to an arm or lug 303 of the said rock-shaft and at its other end to a stationary part of the machine frame. The periphery of the cam is divided into a rising or spiral portion extending between the points $e$ $e^1$, a concentric portion extending between the points $e^1$ $e^2$, a sharply descending portion extending between the points $e^2$ $e^3$, and a short concentric portion extending between the points $e^3$ and $e$. The cam arm 301 is provided with two points of contact with the cam, embracing two antifriction rollers 304, 305. During the time the contacting point of the cam arm engages the concentric portion of the cam from the points $e^1$ to $e^2$, the gum receiving pocket remains in its uppermost position, as indicated in dotted lines in Fig. 21 and in full lines in Fig. 17, the said parts being thus held in their uppermost position by the positive action of the cam. During the time the contacting part of the lever is passing from the points $e^2$ $e^3$, the spring 302 is acting through the shaft 258 to depress the pocket actuating arm 257 and to depress the said pocket from the position shown in Fig. 17 to that shown in Fig. 19. The said pocket remains a short time in its depressed position during the time the engaging part of the cam arm is passing from the point $e^3$ to $e$, and the pocket is raised from its lowermost to its upper position during the time the engaging part of the cam arm is traveling from the points $e$ to $e^1$. The roller 304 at the end of the cam arm engages the rising portion of the cam, while the inner roller 305 of said cam arm engages the concentric portion of the cam between the points $e^1$ $e^2$. After the point $e^2$ of the cam passes the outer roller 304, the outer end of the arm projects beyond said point $e^2$ and the roller 305 is engaged with the cam. When the point $e^2$ of the cam passes the inner roller 305 the arm drops quickly inwardly toward the center of the cam until the outer roller 304 thereof engages with the lower concentric portion of the cam from the points $e^3$ $e^1$. There is thus produced a prompt depression of the gum receiving pocket under the action of the spring 302. It will be noted that at the time the cam arm drops quickly toward the center of the cam, the end of the cam arm beyond the inner roller bridges the space between the point $e^2$ of the cam and the lower concentric portion thereof, thus allowing the cam arm to pass smoothly from the highest to the lowest point of the cam and without tendency to bring a shock or jar on the parts or tendency of the cam arm to lock the cam, such as might occur if the cam arm were made shorter and adapted for but one point of bearing with the cam.

Referring now to the mechanism for applying paste to the rear face of the lower end of the band while the same is in the position shown in Fig. 17, the same is shown most clearly in Figs. 3, 17, 18, 21 and 23 to 26, inclusive, and is made as follows: The paste-pot 245 is located in rear of the discharge chute 258$^a$ and the front wall thereof constitutes the rear wall of said chute, as stated. The pot comprises in addition thereto side walls 315, 315 and a curved rear wall 316. Between the top of the front wall 272 of said pot and the curved rear wall 316 is located a narrow flat horizontal part constituting the stop or support 244 to arrest the bands as they are stripped from the bundle in the magazine above. Between said horizontal part 344 and the rear curved wall is a narrow upwardly and forwardly inclined wall portion 317. Located within the said paste-pot and having bearing in the side walls thereof is a short rock-shaft 320 which carries a paste applying arm, comprising a radial member 321 and a curved member 322, which latter is disposed concentric to the axis of said rock-shaft. The paste applying arm is adapted to swing vertically about the axis of said shaft 320. It is normally located at the bottom of the paste-pot and submerged in a body of liquid paste therein and is adapted to be rocked upwardly and to be projected through a suitable opening 323 in the inclined part of the top wall of the paste-pot for contact with the lower end of the paper-band which is supported on the horizontal portion 244 thereof. Said horizontal portion of the top of the paste-pot is provided with a drip opening 324 located closely adjacent to the opening 323 to catch and return any liquid paste that may drip from the paste applying arm when in its uppermost or applying position. The mechanism for operating said paste applying arm is shown most clearly in Figs. 1, 13 and 21, and is made as follows: 330 designates a horizontal rock-shaft which extends transversely across and has bearing in the machine frame. Said rock-shaft is operatively connected with the rock-shaft 320 of the paste pot by means permitting separation or disconnection of said parts, as more clearly shown in Figs. 23 and 25. For this purpose said rock-shaft 330 is provided at its outer end with a notch and the adjacent end of the rock-shaft 320 is provided with a sleeve or coupling 331 which receives said rock-shaft and has a transverse pin 332 over which the notched end of said rock-shaft fits. This construction permits the paste-pot to be detached from the machine when drawn away from the shaft 330 endwise thereof. The mechanism for giving intermittent rocking motion to said shaft to intermittently operate the paste applying arm comprises an eccentric 335 affixed to the horizontal rotative shaft 198, an eccentric rod 336 attached at its upper end to an eccentric strap 337 surrounding the eccentric and at its lower end to a radial arm 338 fixed rigidly to the rock-shaft 330 and to which said cam rod is hinged, (Fig. 21).

The said paste pot is removably attached to the machine by means of a horizontal lug 340 extending laterally therefrom (Figs. 23 and 24) that is adapted to fit in overlapping relation upon a horizontal lug 341 of the bracket 45, which latter lug is provided with a notch 342 adapted to receive a stud 343 fixed to the glue pot lug and provided with a nut 344 by which it is locked in place.

I claim as my invention:—

1. In a wrapping machine, a swinging folding arm and a folder pivoted thereto to swing on an axis transverse to the axis of movement of the arm, and a stationary guide engaging the folder to rotate the same during the swinging movement of the arm.

2. In a wrapping machine, a swinging folding arm, a folder pivoted thereto provided with a flat folding surface and a guide surface, and a stationary guide engaged by said guide surface to swing the folder on its pivotal axis.

3. In a wrapping machine, a swinging folding arm, a folder pivoted thereto and formed on one side to provide a curved guide surface and a stationary guide located in the path of the folder to engage the curved guide surface of the folder to swing the latter on its pivotal axis.

4. In a wrapping machine, means for folding the wrapper about the sides of the article, and means for folding the end flaps of the wrapper against the article comprising swinging folding arms arranged to swing past the ends of the article, folders hinged to the arms to rotate on axes transverse to the axes of movement of said arms, and guides engaging said folders to rotate the same during the swinging movement of said arms.

5. Means for folding the end flaps of the wrapper of a partially wrapped flat article against the side of the package comprising a swinging folder formed with a flat folding surface and movable past the end of the article, and a fixed guide for engaging said folder to turn it on its axis to present it flatwise toward the side of said package for the purpose set forth.

6. In a folding machine, means for folding the end flaps of the wrapper about the sides of a flat article, a narrow slot into which the partially wrapped article is delivered with the end flaps of the wrapper projecting therefrom, rotating folders provided with folding faces adapted to move past the ends of said slot in planes transverse to the plane of the slot and means for rotating the folder to move the folding surfaces thereof parallel with said slot.

7. In a wrapping machine, means for folding the end flaps of the wrapper about the sides of a flat article, a narrow slot into which the partially wrapped article is delivered with the end flaps of the wrapper projecting therefrom, swinging folders provided with flat folding surfaces adapted to be moved past the ends of said slot in planes transverse to the plane of the slot and guides engaging said folders to swing the same with their folding surfaces parallel with the plane of the slot, for the purpose set forth.

8. In a wrapping machine, means for folding the wrapper about the sides of the article, a slot into which the partially wrapped article is delivered with the end flaps of the wrapper projecting therefrom, a stationary plate forming one of the walls of said slot, rotatively mounted folders provided with folding surfaces, adapted to be moved past the ends of the slot and means for turning said folders inwardly with their folding surface against the face of said wall plate.

9. In a wrapping machine, means for folding the wrapper about the sides of the article, a slot into which the partially wrapped article is delivered with the end flaps of the wrapper projecting therefrom, a stationary plate forming one of the walls of said slot, rotatively mounted folders, provided with flat folding surfaces, adapted to be moved past the ends of the slot, means for turning said folders inwardly with their flat folding surfaces against the face of said wall plate to fold said flaps against said wall plate, and means for discharging the completely wrapped articles from the slot while the folders are holding said end flaps against said wall plate.

10. In a wrapping machine, means for folding the wrapper about the sides of the article, a slot into which the partially wrapped article is delivered with the end flaps of the wrapper projecting therefrom, a plate constituting one side wall of the slot, plates located at the ends of the slot at right angles thereto, rotative folders provided with folding surfaces normally resting against said plates at the ends of the slot, means for moving said folders past the ends of the slot, and means for rotating the folders on their axes to bring their folding surfaces parallel with the said wall plate.

11. In a wrapping machine, means for folding the wrapper about the sides of the article, a slot into which the partially wrapped article is delivered with the end flaps of the wrapper projecting therefrom, a plate constituting one side wall of the slot, plates located at the ends of the slot at right angles thereto, rotative folders provided with folding surfaces normally resting against said end plates, means for moving said folders past the ends of the slot, said folders being provided on their sides opposite the folding surfaces thereof with curved guide surfaces, and stationary guides at the ends of said slot acting to turn the folders inwardly against said wall plate.

12. In a wrapping machine, means for folding the wrapper about the sides of the article, a slot into which the partially wrapped article is delivered with the end flaps of the wrapper projecting therefrom, means for creasing the bases of the end flaps of the wrappers as they are delivered to the slot, and means for folding the said end flaps against the side of the package comprising two swinging folding arms movable past the slot and folders pivoted to said arms to rotate in planes transverse to the planes of movement of said arms.

13. In a wrapping machine, means for folding the wrapper about the sides of the article, a slot into which the partially wrapped article is delivered with the end flaps of the wrapper projecting therefrom, a plate constituting one of the walls of said slot and provided at its ends with laterally turned flanges, crimping plates located in alinement with and adjacent to said flanges, and folders for folding said end flaps flat against the said wall plate.

14. In a wrapping machine, means for folding the wrapper about the sides of the article, a slot into which the partially wrapped article is delivered with the end flaps of the wrapper projecting therefrom, a plate constituting one of the walls of said slot and provided at its ends with laterally turned flanges, crimping plates located in alinement with and adjacent to said flanges, and folders for folding said end flaps flat against the said wall plate, the ends of said crimping plates and said flanges being convexly curved.

15. In a wrapping machine, means for folding the wrapper about the sides of the article, a slot into which the partially wrapped article is delivered and from which the end flaps extend, folding means acting on the said flaps to complete the wrapping of the article, one wall of said slot being hinged to swing toward and away from the other wall thereof, an apertured lug extending laterally from said hinged wall, a headed pin extending therethrough and a spring surrounding said pin and interposed between said lug and a shoulder on the pin, said spring acting to yieldingly hold the lug against the head of said pin.

16. In a wrapping machine, a swinging folded arm, means for delivering a partially wrapped article thereto, means coöperating with said arm during its swinging movement to complete the side wrapping of the article, means operating thereafter to fold the end flaps of the wrapper against the article, a receiving chamber to which the wrapped articles are delivered, an assembling space, means for transferring the wrapped articles from the receiving chamber to the assembling space, a movable partition between the receiving chamber and assembling space, and operative connections between said folding arm and said partition operating to depress said partition out of the path of said articles as they are transferred from the receiving chamber to the assembling space.

17. In a wrapping machine, a swinging folding arm, means for delivering a partially wrapped article thereto, means cooperating with said arm during its swinging movement to complete the side wrapping of the article, means operating thereafter to fold the end flaps of the wrapper against the article, a receiving chamber to which the wrapped articles are delivered, an assembling space, means for transferring the wrapped articles from the receiving chamber to the assembling space, a swinging arm provided with a finger adapted normally to extend between the said chamber and assembling space to constitute a dividing partition, a rock-shaft on which said arm is mounted, and means controlled by the movement of said folding arm for rocking said shaft to depress said partition finger.

18. In a wrapping machine, a swinging folding arm, means for delivering a partially wrapped article thereto, means cooperating with said arm during its swinging movement to complete the side wrapping of the article, means operating thereafter to fold the end flaps of the wrapper against the article, a receiving chamber to which the wrapped articles are delivered, an assembling space, means for transferring the wrapped articles from the receiving chamber to the assembling space, a swinging arm provided with a finger adapted to extend between the said chamber and assembling space to constitute a dividing partition, a rock-shaft on which said arm is mounted, a tripping arm rigid on said rock-shaft and a tripping device movable with said folding arm for engaging said tripping arm to depress the partition finger.

19. In a machine for wrapping, grouping and banding articles, mechanism for folding the wrappers about the articles, mechanism for grouping the wrapped articles and applying confining bands to the groups and pasting them thereon, said latter mechanism embracing means for effecting a constant confining action on the wrappers during the entire grouping operation and until the bands are applied to hold the wrapper flaps properly against the wrapped articles.

20. In a machine for wrapping, grouping and banding flat, thin articles, mechanism for folding the wrappers about the articles, with their flaps overlapping the flat sides of the articles, mechanism for assembling the articles flatwise in groups and for applying confining bands to such groups and pasting the ends of the bands together, said mechanism embracing means to constantly hold the wrapped articles pressed together in a manner to confine the flaps upon the articles until the bands are applied.

21. In a machine for wrapping, grouping and banding flat, thin articles, mechanism for folding the wrappers about the articles, mechanism for assembling the articles flatwise in groups and mechanism associated therewith for applying confining bands to such groups and pasting the ends of the bands together, the grouping mechanism embracing means for effecting constant confining action on the wrappers to maintain the folded wrappers in place on the articles until the bands are applied and the banding mechanism embracing means to maintain pressure on the pasted bands until the paste sets.

22. In a machine for wrapping, grouping and banding flat, thin articles, mechanism for folding the wrappers about said articles with their flaps overlapping the sides of the articles and mechanism for assembling the wrapped articles flatwise together in groups and for applying bands to said groups, said latter mechanism embracing means acting against the wrapped articles of the groups in a direction to hold the overlapping flaps pressed against the wrapped articles until the bands are applied.

23. In a machine for wrapping, grouping and banding flat, thin articles, mechanism for folding the wrappers about said articles, and mechanism for assembling the wrapped articles flatwise together in groups and for applying confining bands to said groups, said latter mechanism embracing resilient means acting to yieldingly hold the articles flatwise together until the bands are applied.

24. In a machine for wrapping, grouping and banding flat, thin articles, mechanism for folding the wrappers about the sides of said articles, mechanism for folding the end flaps of the wrappers against the sides of the packages and mechanism for assembling the wrapped articles flatwise together in groups and for applying confining bands to said groups, said latter mechanism embracing means acting against the flat sides of the wrapped articles of the groups to hold them flatwise together to maintain the wrappers folded until the bands are applied.

25. In a wrapping, grouping and banding mechanism, means for wrapping the articles, means for assembling the wrapped articles in groups with certain of the articles of each group reversed relatively to the others, and means for applying confining bands to said groups.

26. In a wrapping, grouping and banding machine, means for wrapping the articles, means for assembling the wrapped articles in groups, means for reversing certain of the articles of each group, and means for applying confining bands to said groups.

27. In a machine for wrapping, grouping and banding articles, mechanism for folding the wrappers about the articles, mechanism for assembling the wrapped articles together in groups and for applying bands to the groups and pasting the ends of the bands together, said latter mechanism embracing resilient means for pressing the intermediate portions of the bands yieldingly against the gums of the groups while the bands are applied thereto and while the ends of the bands are being folded together for pasting them.

28. In a machine for wrapping, grouping and banding flat, thin articles, mechanism for folding the wrappers about the sides and ends of the articles and mechanism for assembling the wrapped articles flatwise together in groups, with the end flaps of the wrappers confined between individual articles of the groups and for applying confining bands to the groups and pasting the ends of said bands together, said latter mechanism embracing resilient means for yieldingly holding the intermediate portions of the bands pressed against the groups while the bands are being applied thereto and while the ends of the bands are being folded together for pasting.

29. In a machine for wrapping, grouping and banding flat, thin articles, means for folding the wrappers about the articles, mechanism for assembling the wrapped articles flatwise together in groups, a band applying mechanism and means for transferring the groups to the band applying mechanism, said band applying mechanism embracing a pocket or recess arranged to receive a group and a band, associated with means for folding the band about the group and pasting the ends of the band together, the pocket being provided with a resiliently supported member against which the group and the intermediate portion of the band are pressed as they enter the pocket, for the purpose set forth.

30. In a machine for wrapping, grouping and banding flat, thin articles, mechanism for folding the wrappers about said articles, mechanism for assembling the wrapped articles flatwise together in groups, and applying confining bands thereto and pasting the ends of said bands together, combined with means acting to effect a constant confining pressure against the flat sides of the articles for holding them flatwise together, and an elongated discharge chute through which the banded groups are discharged and by which the bands are pressed to set the paste thereon.

31. In a machine for wrapping, grouping and banding flat thin articles, mechanism for folding the wrappers about said articles, mechanism for assembling the wrapped articles flatwise together in groups, and applying confining bands thereto and pasting the ends of said bands together, combined with means acting to effect a constant confining pressure against the flat sides of the articles for holding them flatwise together, an elongated discharge chute through which the banded groups are discharged and by which the bands are pressed to set the paste thereon, and means whereby the groups are advanced through said chute by pressure of the groups which follow.

32. In a wrapping, grouping and banding machine, a wrapping mechanism, means for feeding the articles to said mechanism, together with the wrappers in which they are wrapped by said mechanism, a stationary assembling chamber having a fixed bottom, means for assembling the articles in groups on said fixed bottom of the chamber, a band-applying mechanism arranged horizontally in line with said fixed bottom, and means for transferring the groups of articles from said assembling chamber to the band applying mechanism.

33. In a machine for wrapping thin articles, grouping them and banding the groups, comprising a wrapping mechanism, means for feeding the articles to said mechanism, together with the wrappers in which they are wrapped by said mechanism, an assembling chamber, means for discharging the wrapped articles on edge into said chamber, means for assembling the wrapped articles in groups and for maintaining them upright in said chamber, a band applying mechanism and means for transferring said groups while the said articles remain on edge to the band-applying mechanism.

34. In a machine for wrapping, grouping and banding thin articles, comprising a wrapping mechanism, means for feeding the articles together with the wrappers to said mechanism, an assembling chamber, and means for discharging the wrapped articles on edge in said chamber and grouping them therein, and for maintaining the articles of the groups upright in said chamber, a banding mechanism, a horizontal passage connecting said banding mechanism with the assembling chamber, and means for transferring said groups while the articles remain on edge directly from the assembling chamber to the banding mechanism.

35. In a wrapping, grouping and banding machine, a wrapping mechanism, means for delivering articles to said mechanism together with wrappers in which they are wrapped by said mechanism, a stationary assembling chamber having a fixed bottom, a band applying mechanism and means for assembling the wrapped articles in groups on said fixed bottom of the assembling chamber and for transferring the groups of wrapped articles to the band applying mechanism embracing a plunger which reciprocates through said assembling chamber.

36. In a wrapping, grouping and banding machine, a wrapping mechanism, means for delivering the articles and wrappers to said mechanism, a band applying mechanism and a single plunger constructed to assemble the wrapped articles in groups and deliver them to the band-applying mechanism.

37. A wrapping machine comprising means for wrapping the articles, a receiving chamber to which the wrapped articles are delivered one by one, an assembling space, a plunger for transferring the wrapped articles from the receiving chamber to the assembling space to group the same, a band applying mechanism, and a cam for operating said plunger constructed and arranged to impart to said plunger a number of strokes equal to that of the wrapped articles in a group, one of which is of a length to deliver the entire group from the assembling space to the band applying mechanism.

38. In a wrapping machine, means for wrapping the articles, a receiving chamber to which the wrapped articles are delivered one by one, an assembling space, a plunger reciprocating through the receiving chamber for transferring the articles one by one from the receiving chamber to the assembling space to group the same, a band applying mechanism, and means for imparting a longer stroke to the transfer plunger as each group is completed for transferring the entire group to the band applying machine.

39. In a wrapping, grouping and banding machine, a wrapping mechanism, means for feeding the articles to said mechanism, together with the wrappers in which they are wrapped by said mechanism, a stationary assembling chamber, means for assembling the wrapped articles in groups in said chamber, a band applying mechanism, and means for transferring the groups of articles in a direct path from the stationary assembling chamber to the band applying mechanism.

40. In a machine for wrapping and banding thin articles, means for folding the wrappers about the side and ends of the articles, means for assembling said wrapped articles in groups, embracing a stationary assembling chamber in which the articles are assembled flatwise together, a band applying mechanism, means for transferring the groups directly from the assembling chamber to the band applying mechanism, said band applying mechanism means for supporting bands while extending across the path of said groups, whereby the bands are applied to the groups as the groups are delivered to the band applying mechanism.

41. In a wrapping machine, means for wrapping thin articles, means for assembling said articles in groups, a stationary chamber in which the articles are assembled flatwise together, a band applying mechanism, means for transferring the groups of articles directly from the assembling space to the band applying mechanism, said band applying mechanism means for supporting bands while extending across the path of said groups, and means for applying paste to the bands while they extend across said path, said band applying mechanism being constructed to partially wrap a band about each group as it is delivered thereto.

42. In a machine for wrapping, grouping and banding thin articles, comprising a wrapping mechanism having a vertical slot in which the articles are held during the final wrapping operation, means for feeding the articles, together with the wrappers, to said wrapping mechanism, an assembling chamber into which the said wrapped articles are discharged on edge, means for assembling the wrapped articles in groups in said chamber while on edge, a band-applying mechanism, and means for transferring the groups of articles in a horizontal path from the assembling chamber to the band-applying mechanism, said band-applying mechanism comprising means for feeding bands across the path of the groups, whereby a band is partially wrapped around each group when inserted into the mechanism, and means for thereafter folding the ends of the bands upon each other.

43. In a machine for wrapping, grouping and banding thin articles, comprising a wrapping mechanism having a vertical slot in which the articles are held during the final wrapping operation, means for feeding the articles together with the wrappers, to said wrapping mechanism, an assembling chamber into which the said wrapped articles are discharged on edge, means for assembling the wrapped articles in groups in said chamber while on edge, a band-applying mechanism, and means for transferring the groups of articles in a horizontal path from the assembling chamber to the band applying mechanism, said band applying mechanism comprising means for feeding the bands across the path of the groups, whereby a band is partially folded around each group when inserted into the mechanism, means for thereafter folding the ends of the band upon each other, and means for applying paste to one end of each band prior to the end-folding operation.

44. In a wrapping machine, means for wrapping the articles, means for assembling the wrapped articles in groups, a band applying mechanism, means for transferring the groups from the assembling space to the band applying mechanism, means for supporting the bands while extending across the path of said groups, a paste-pot located at the receiving side of the band applying mechanism, a paste applying arm normally submerged in liquid paste in said pot, and means for projecting said arms from the pot into contact with said wrappers when supported across the path of said groups, said band applying mechanism being constructed to automatically wrap the bands about the group as it is delivered to said mechanism.

45. In a wrapping machine, means for wrapping the articles, means for assembling said wrapped articles in groups, a band applying mechanism, means for transferring the groups from the assembling space to the band applying mechanism, means for supporting the bands while extended across the path of said groups, a paste pot located beneath the wrapper support and provided in its top wall with an opening, a rotatively mounted paste applying arm normally submerged in liquid paste in the pot, and means for rotating said arm on its axis to project it outwardly through said top opening into contact with said wrapper, said band applying mechanism being constructed to automatically wrap the band about the group as it is delivered to said mechanism.

46. In a wrapping machine, means for wrapping the articles, means for assembling said articles in groups, mechanism for applying confining bands around the groups, means for transferring the groups to the band applying mechanism, means for feeding the bands across the path of said groups, whereby a band is partially wrapped about a group as the group is delivered to the wrapping mechanism, a paste-pot, the top wall of which constitutes the support for the band while extending across the path of said groups, said top wall of the pot being provided adjacent to the band with an opening, a paste applying arm and means for projecting said paste applying arm through said opening to apply paste to said band.

47. The combination with a wrapping and grouping machine, of mechanism for applying confining bands to the groups, means whereby the groups and bands are delivered to the band applying mechanism in a manner to partially wrap the bands about the groups, a paste pot, a paste applying arm therein, a rock-shaft to which said arm is attached, a rock-shaft fixed in the machine and detachably connected at its end with the end of the paste-pot rock-shaft to rock the latter and thereby project the paste applying arm into contact with the bands, and means for removably attaching the paste-pot to the frame of the machine.

48. In a machine for wrapping, grouping and banding thin articles, comprising a wrapping mechanism having a vertical slot in which the article is held during the final wrapping operation, means for feeding the articles, together with the wrappers, to said mechanism, a horizontal assembling chamber beneath said slot into which the wrapped articles are delivered on edge, and means for thereafter assembling the wrapped articles in groups and for applying bands to the groups while the articles remain on edge.

49. A machine for wrapping, grouping and banding thin articles, comprising a wrapping mechanism having a vertical slot in which the articles are held during the final wrapping operation, means for feeding the articles, together with the wrappers, to said wrapping mechanism, a horizontal assembling chamber beneath said slot into which the wrapped articles are delivered on edge, means for thereafter assembling the articles in groups and for applying bands to the groups while the articles remain on edge, means for applying paste to the bands and means for exerting pressure on said banded groups to set the paste on the bands and to compact the groups.

50. In a wrapping, grouping and banding machine, a wrapping mechanism, means for delivering articles, together with the wrappers, to said mechanism, a discharge chute, means for assembling the articles in groups, means for applying bands to said groups and pasting the bands thereon, including a pocket movable in the discharge chute and means for applying pressure to said groups as they pass through said chute to compact the groups and to confine the bands until the paste sets.

51. In a wrapping, grouping and banding machine, means for wrapping the articles, an elongated discharge chute, means by which the wrapped articles are assembled in groups, means for applying bands to and pasting them on said groups, including a pocket movable in said discharge chute, and an elongated spring-pressed device on the longitudinal wall of the chute for holding the banded groups under pressure while said groups pass through the chute.

52. In a wrapping, grouping and banding machine, means for wrapping the articles, means for assembling the articles in groups, and means for applying bands to the groups comprising a pocket open at one side to receive the group, means for delivering a group and a band into said pocket to wrap the intermediate portion of the band upon the group, means for folding the ends of the band together in overlapping relation, a discharge chute at the receiving end of which said pocket is located and means for discharging the wrapped groups from the pocket to said discharge chute and discharging them through said chute.

53. In a wrapping, grouping and banding machine, means for wrapping the articles, means for assembling the articles in groups and mechanism for applying bands to said groups comprising a pocket open at one side into which said groups are inserted, means for feeding bands across the open side of the pocket whereby a band is forced into the pocket when a group of articles are delivered thereto in a manner to partially wrap the band about the group, means for thereafter folding the ends of the band one upon the other, and a discharge chute at the receiving end of which said pocket is located, said pocket having a hinged side to release the banded groups from the pocket to the chute.

54. In a wrapping machine, means for wrapping the articles, means for assembling the articles in groups and means for applying bands to said groups comprising a pocket open at one side to receive the groups, means for delivering a band across the open side of the pocket whereby it is forced into the pocket with a group and thereby partially wrapped about the group, a folding finger for folding one of the free ends of a band against the group, means for depressing the pocket, and means operating during the depression of the pocket for folding the other end of the band in overlapping relation to the first end.

55. In a wrapping machine, means for wrapping the articles, means for assembling them in groups, a band applying mechanism embracing a pocket at one side, means for delivering a group of articles and a band into the pocket to wrap the intermediate part of the band about the group, a discharge chute in line with said pocket, a folding finger adapted to fold one of the ends of the band upon the group, means for depressing said pocket into the chute to fold the other end of the band between said group and one wall of the chute, and means for thereafter discharging the wrapped group from the pocket into said chute.

56. In a wrapping machine, means for wrapping the articles, means for assembling them in groups, a band applying mechanism embracing a pocket open at one side, a discharge chute in line with the pocket, means for depressing said pocket into said chute, means for delivering a group of wrapped articles and a band into the pocket and for wrapping the band about the group, and means for raising said pocket from the chute, the bottom wall of said pocket being movable to discharge a banded group of articles from the pocket into the chute during the rising movement of the pocket.

57. In a wrapping machine, means for wrapping the articles, means for assembling them in groups, a band applying mechanism embracing a pocket open at one side, a discharge chute in line with said pocket, means for depressing said pocket into the discharge chute, the bottom wall of said pocket being hinged to swing downwardly, means for delivering a group of articles and a band into the pocket and wrapping the band about the group, and means whereby said bottom wall swings downwardly as the pocket rises so as to discharge gums from the pocket into the chute.

58. In a wrapping machine, means for wrapping the articles, means for assembling them in groups, a band applying mechanism embracing a pocket open at one side, a discharge chute in line with said pocket, means for lowering the pocket into the discharge chute and raising it therefrom, means for delivering a group of articles and a band into the open side of the pocket to wrap the intermediate portion of the band about the group, a folding finger engaging one end of the band to fold the same upon the group, the other end of the band being folded upwardly between said group and one wall of the chute when the pocket is moved downwardly into the chute, the bottom wall of said pocket being hinged to swing downwardly as the pocket rises, and means for engaging the banded group of articles as the pocket rises to hold the articles from rising in the chute.

In testimony, that I claim the foregoing as my invention I affix my signature in the presence of two witnesses, this 23d day of February A. D. 1907.

HARRY YARRINGTON ARMSTRONG.

Witnesses:
FRED TATTERSALL,
BERTHA H. BIERMANN.